United States Patent
Mercer et al.

(10) Patent No.: US 12,202,366 B2
(45) Date of Patent: Jan. 21, 2025

(54) INDICATOR LIGHTS FOR AN ELECTRIC VEHICLE CHARGING STATION

(71) Applicant: Volta Charging, LLC, San Francisco, CA (US)

(72) Inventors: Scott Mercer, Pacifica, CA (US); Alexandra Prodaniuk, Pacifica, CA (US); Kayla Matheus, San Francisco, CA (US)

(73) Assignee: Volta Charging, LLC, San Francisco, CA (US)

( * ) Notice: Subject to any disclaimer, the term of this patent is extended or adjusted under 35 U.S.C. 154(b) by 576 days.

(21) Appl. No.: 17/523,643

(22) Filed: Nov. 10, 2021

(65) Prior Publication Data

US 2022/0063432 A1   Mar. 3, 2022

Related U.S. Application Data

(63) Continuation of application No. PCT/US2020/032319, filed on May 11, 2020.
(Continued)

(51) Int. Cl.
*H02J 7/00* (2006.01)
*B60L 53/60* (2019.01)
(Continued)

(52) U.S. Cl.
CPC .......... *B60L 53/60* (2019.02); *F21S 4/28* (2016.01); *H02J 7/0047* (2013.01); *F21Y 2105/14* (2016.08); *F21Y 2115/10* (2016.08)

(58) Field of Classification Search
CPC .......... B60L 53/10; B60L 53/60; H02J 7/0047
See application file for complete search history.

(56) References Cited

U.S. PATENT DOCUMENTS

| 8,427,076 B2 | 4/2013 | Bourquin et al. |
| 9,352,652 B2 | 5/2016 | Cavazos et al. |
| (Continued) | | |

FOREIGN PATENT DOCUMENTS

| CA | 3064664 A1 | 11/2018 |
| CN | 206870880 U | 1/2018 |
| WO | WO2012/088223 A2 | 6/2012 |

OTHER PUBLICATIONS

Volta Charging, LLC, Notice of Allowance, JP2021-568009, Dec. 4, 2023, 3 pgs.
(Continued)

*Primary Examiner* — Robert Grant
(74) *Attorney, Agent, or Firm* — Morgan, Lewis & Bockius LLP

(57) ABSTRACT

The disclosed embodiments include a charging station for an electric vehicle. The charging station includes a plurality of light sources, one or more processors, and memory storing instructions for performing a set of operations. The set of operations includes determining a state of the charging station, the state indicating a status of an electric vehicle at the charging station. In accordance with a determination that the state is a first state, the charging station provides a first visual indication of the first state using a first light source of the plurality of light sources. In accordance with a determination that the state is a second state, the charging station provides a second visual indication of the second state.

20 Claims, 25 Drawing Sheets

Related U.S. Application Data

(60) Provisional application No. 62/847,160, filed on May 13, 2019.

(51) Int. Cl.
*F21S 4/28* (2016.01)
*F21Y 105/14* (2016.01)
*F21Y 115/10* (2016.01)

(56) References Cited

U.S. PATENT DOCUMENTS

| | | |
|---|---|---|
| 9,597,970 B2* | 3/2017 | DeBoer, III ............ B60L 53/18 |
| 9,779,365 B2 | 10/2017 | Smullin et al. |
| 2010/0201267 A1 | 8/2010 | Bourquin et al. |
| 2013/0021162 A1 | 1/2013 | DeBoer et al. |
| 2014/0002018 A1 | 1/2014 | Montemayor Cavazos et al. |
| 2017/0106763 A1 | 4/2017 | Dow et al. |
| 2018/0111492 A1 | 4/2018 | McCool et al. |

OTHER PUBLICATIONS

Volta Charging, LLC, International Search Report and Written Opinion, PCT/US2020/032319, Aug. 12, 2020, 25 pgs.
Volta Charging, LLC, International Preliminary Report on Patentbility, PCT/US2020/032319, Nov. 16, 2021, 14 pgs.
Volta Charging, LLC, European Extended Search Report, EP20806372.7, Dec. 19, 2022, 11 pgs.
Volta Charging, LLC, Notice of Reasons for Rejections, JP2021-568009, Dec. 1, 2022, 4 pgs.
Volta Charging, LLC, Communication Pursuant to Article 94(3), EP20806372.7, Sep. 4, 2024, 7 pgs.

* cited by examiner

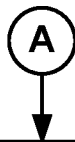

```
┌─────────────────────────────────────────────────────────────┐
│ In accordance with a determination that the state is a first state, provide a │
│   first visual indication of the first state using a first light source of the  │──718
│         plurality of light sources, the first visual indication including a     │
│   programmed first sequence of lights displayed using the first light source.   │
│                                                                                 │
│   ┌ ─ ─ ─ ─ ─ ─ ─ ─ ─ ─ ─ ─ ─ ─ ─ ─ ─ ─ ─ ─ ─ ─ ─ ─ ─ ─ ┐                       │
│   │  The first state is a state that the charging station is not currently  │──720
│   │              occupied by an electric vehicle.                           │
│   └ ─ ─ ─ ─ ─ ─ ─ ─ ─ ─ ─ ─ ─ ─ ─ ─ ─ ─ ─ ─ ─ ─ ─ ─ ─ ─ ┘                       │
│                                                                                 │
│   ┌ ─ ─ ─ ─ ─ ─ ─ ─ ─ ─ ─ ─ ─ ─ ─ ─ ─ ─ ─ ─ ─ ─ ─ ─ ─ ─ ┐                       │
│   │ The first visual indication is an animated sequence of illumination of │──722
│   │ a subset of the plurality of light sources, the subset including the   │
│   │                        first light source.                             │
│   └ ─ ─ ─ ─ ─ ─ ─ ─ ─ ─ ─ ─ ─ ─ ─ ─ ─ ─ ─ ─ ─ ─ ─ ─ ─ ─ ┘                       │
│                                                                                 │
│   ┌ ─ ─ ─ ─ ─ ─ ─ ─ ─ ─ ─ ─ ─ ─ ─ ─ ─ ─ ─ ─ ─ ─ ─ ─ ─ ─ ┐                       │
│   │   The first visual indication comprises an animated sequence of        │──724
│   │   changing colors of a subset of the plurality of light sources, the   │
│   │               subset including the first light source.                 │
│   └ ─ ─ ─ ─ ─ ─ ─ ─ ─ ─ ─ ─ ─ ─ ─ ─ ─ ─ ─ ─ ─ ─ ─ ─ ─ ─ ┘                       │
└─────────────────────────────────────────────────────────────┘

┌─────────────────────────────────────────────────────────────┐
│     In accordance with a determination that the state is a second state,        │
│ provide a second visual indication of the second state, the second visual      │──726
│   indication including a programmed second sequence of lights, distinct        │
│     from the first sequence of lights, displayed using the first light source. │
│                                                                                 │
│   ┌ ─ ─ ─ ─ ─ ─ ─ ─ ─ ─ ─ ─ ─ ─ ─ ─ ─ ─ ─ ─ ─ ─ ─ ─ ─ ─ ┐                       │
│   │   At least one of the first visual indication and the second visual    │──728
│   │   indication comprises a lighted animation that includes simulated     │
│   │                        movement of lights.                             │
│   └ ─ ─ ─ ─ ─ ─ ─ ─ ─ ─ ─ ─ ─ ─ ─ ─ ─ ─ ─ ─ ─ ─ ─ ─ ─ ─ ┘                       │
└─────────────────────────────────────────────────────────────┘
```

Figure 7B

INDICATOR LIGHTS FOR AN ELECTRIC VEHICLE CHARGING STATION

PRIORITY APPLICATIONS

This application is a continuation of International App. No. PCT/US20/32319, filed May 11, 2020, which claims priority to U.S. Prov. App. No. 62/847,160, filed May 13, 2019, each of which is hereby incorporated by reference in its entirety.

TECHNICAL FIELD

This application relates generally to electric vehicle charging stations, and more particular to status indicators (alerts) for an electric vehicle charging station.

BACKGROUND

The transition from fossil-fuel vehicles to electric vehicles is an important step in addressing climate change. However, one of the limiting factors in the transition to electric vehicles is the lack of infrastructure. Electric vehicles need charging stations, generally at more frequent intervals than fossil-fuel vehicles require gasoline stations. In addition, electric vehicle charging generally takes longer than filling a tank with gasoline. Thus, electric vehicle charging stations are often paired with parking spots. It is therefore important, to the technical problem of effective utilization of electric vehicle charging stations, to have efficient human-machine interactions and communications between electric vehicle drivers and charging stations.

SUMMARY

The disclosed embodiments provide a technical solution to this technical problem and improve the efficiency of driver-charging station interactions by providing lighted animations that communicate to the drivers the state of the charging station (e.g., when charging stations are available, when they are occupied, when charging is completed, and so on). Such efficiencies promote the acceptance of electric vehicles and thus mitigate the emission of greenhouse gases.

To that end, in some embodiments, a method is performed at a charging station for an electric vehicle. The charging station including a plurality of light sources, one or more processors and memory storing instructions for performing the method. The method includes determining a state of the charging station, the state indicating a status of an electric vehicle at the charging station. The method further includes, in accordance with a determination that the state is a first state, providing a first visual indication of the first state using a first light source of the plurality of light sources, the first visual indication including a programmed first sequence of lights displayed using the first light source. The method further includes, in accordance with a determination that the state is a second state, providing a second visual indication of the second state, the second visual indication including a programmed second sequence of lights, distinct from the first sequence of lights, displayed using the first light source.

Some embodiments of the present disclosure provide an electric vehicle (EV) charging station with a plurality of light sources, one or more processors and memory storing instructions for performing a set of operations, including determining a state of the charging station, the state indicating a status of an electric vehicle at the charging station. In accordance with a determination that the state is a first state, the EV charging station provides a first visual indication of the first state using a first light source of the plurality of light sources. In accordance with a determination that the state is a second state, the EV charging station provides a second visual indication of the second state.

BRIEF DESCRIPTION OF THE DRAWINGS

For a better understanding of the various described embodiments, reference should be made to the Detailed Description below, in conjunction with the following drawings in which like reference numerals refer to corresponding parts throughout the Figures.

FIGS. 7A-7B illustrate a flowchart of a method for indicating a state of an electric vehicle charging station, in accordance with some embodiments.

DETAILED DESCRIPTION

Figure 1A:
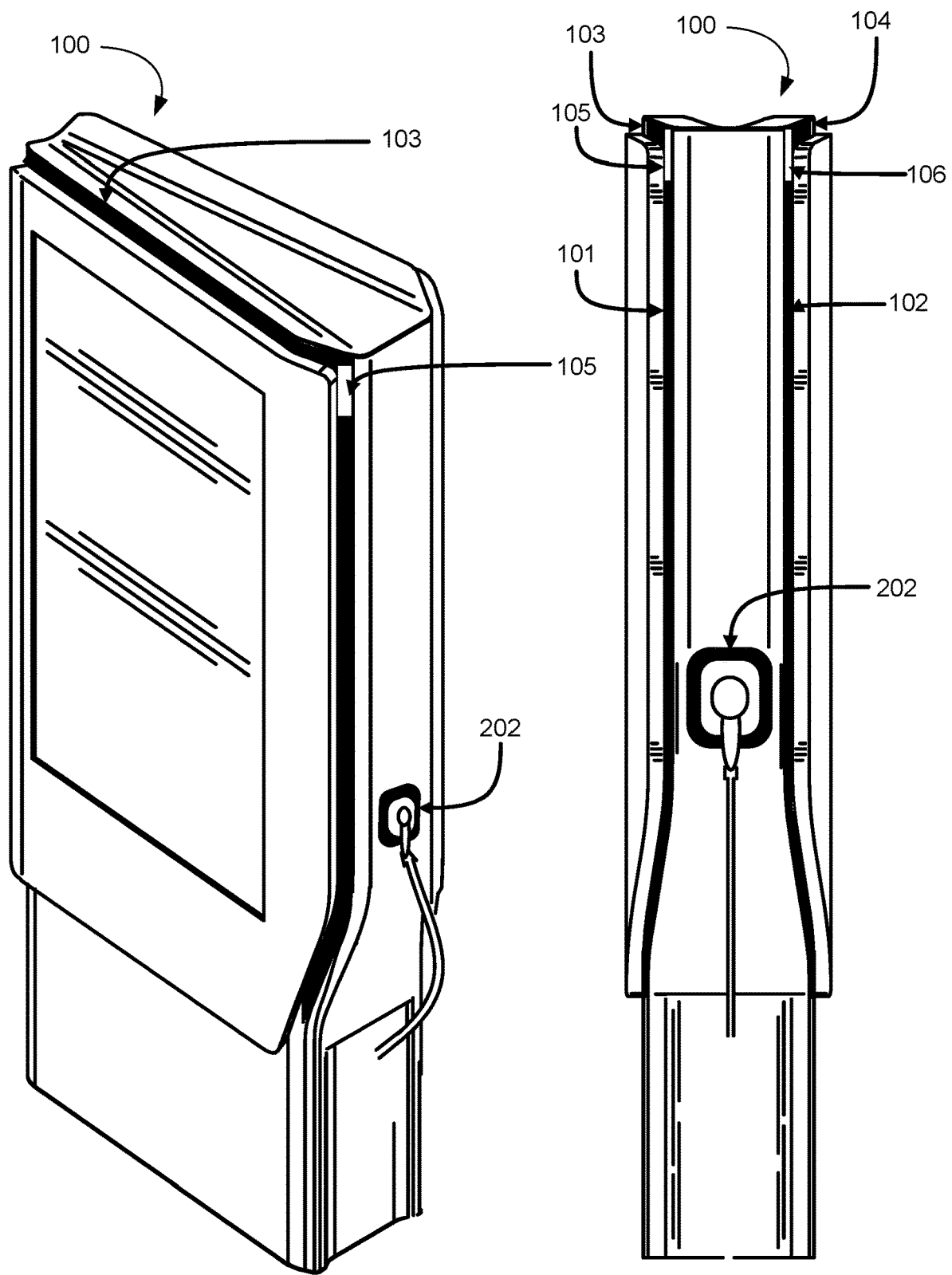
FIGS. 1A-1I illustrate animations and lighting of a charging station for an electric vehicle, in accordance with some embodiments.
Figure 1B:
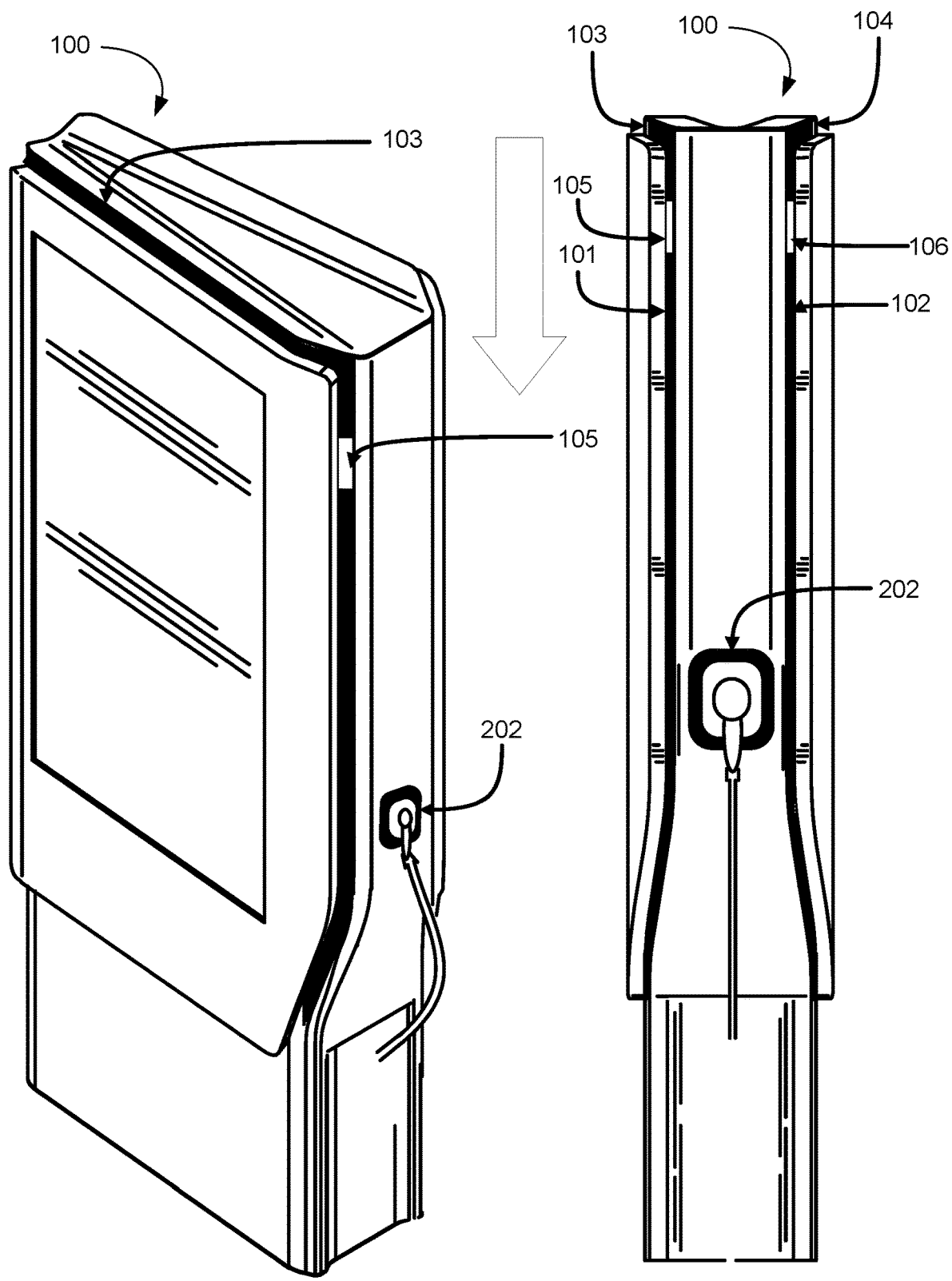
Figure 1C:
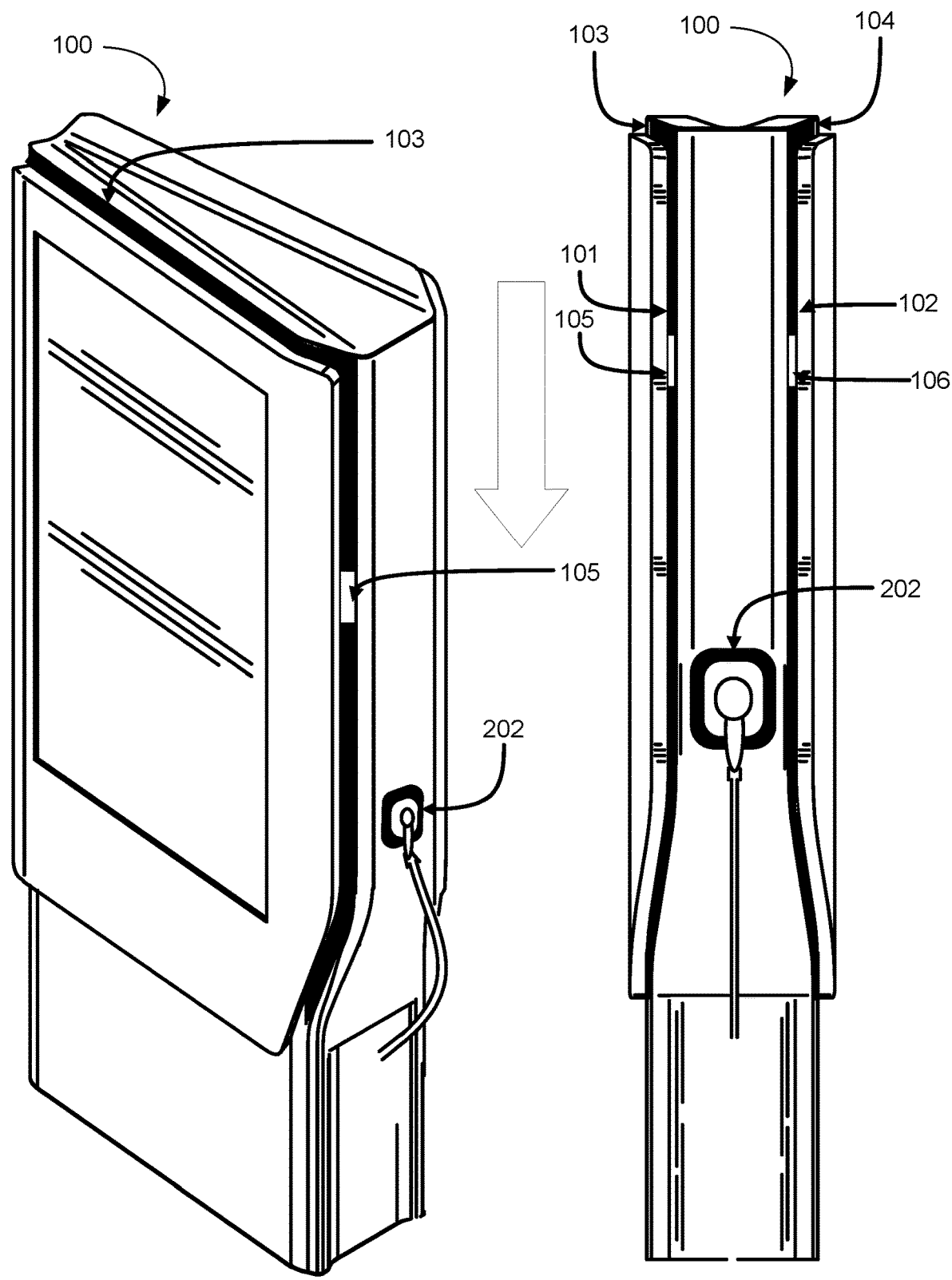
Figure 1D:
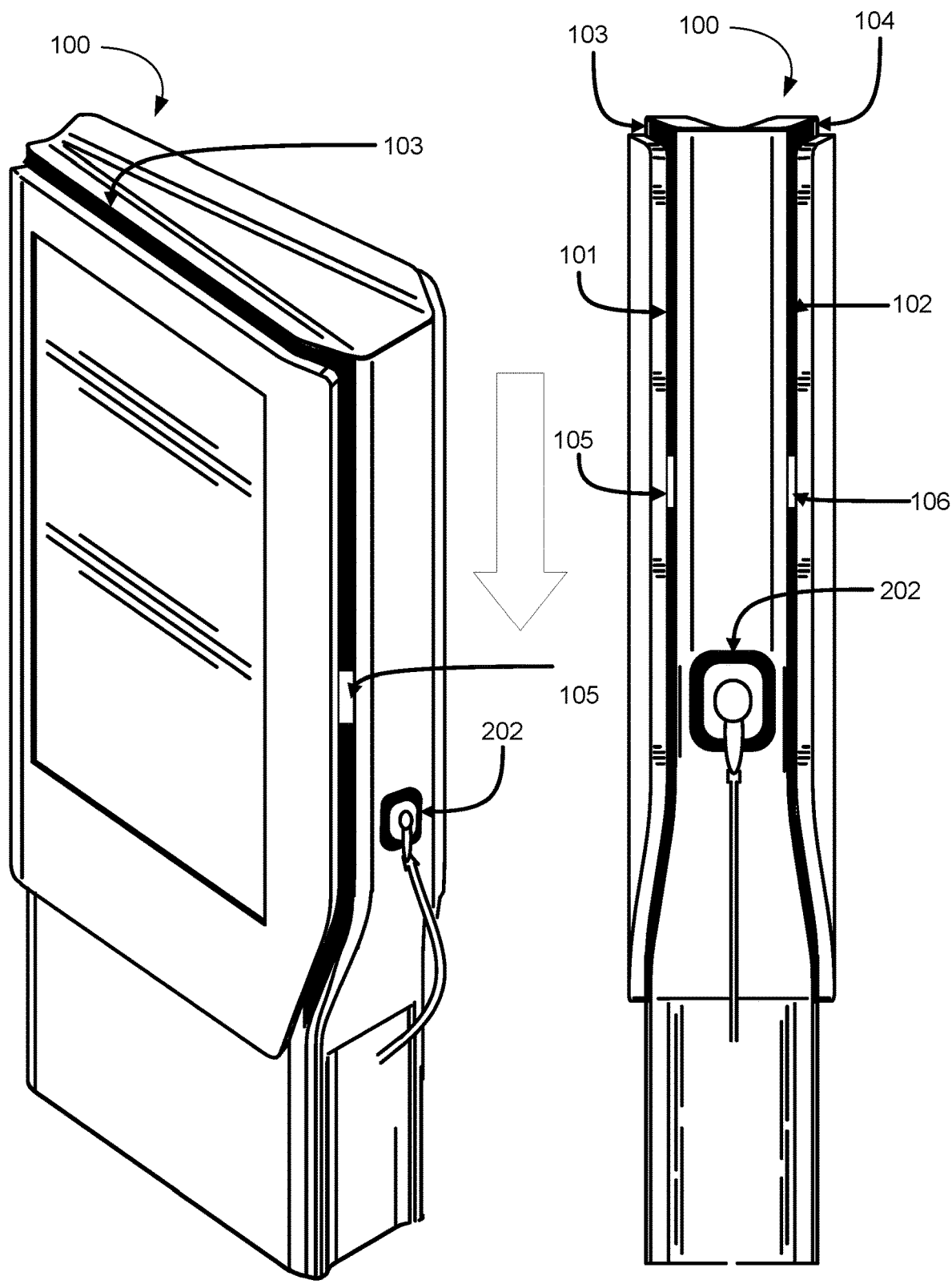
Figure 1E:
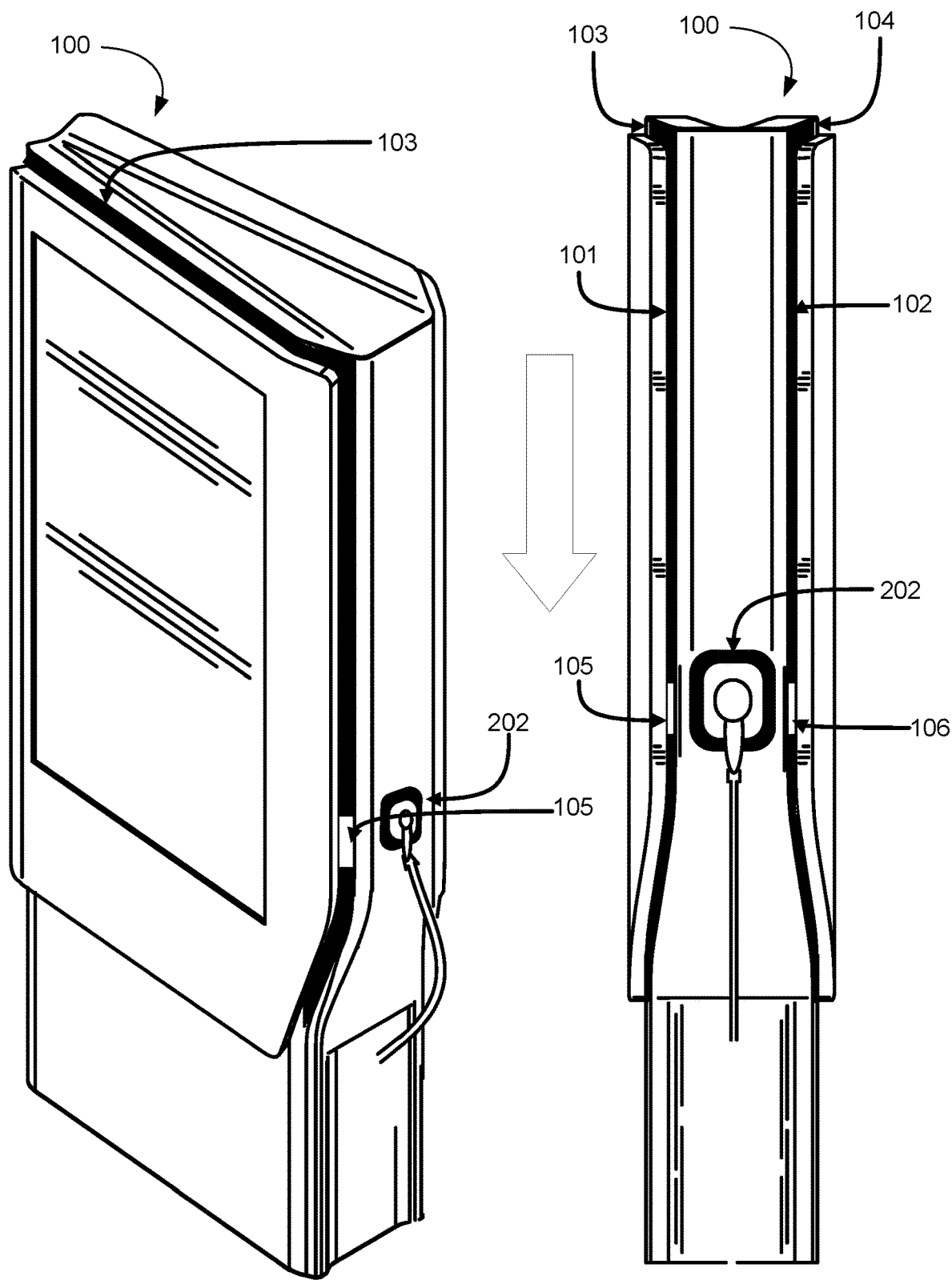
Figure 1F:
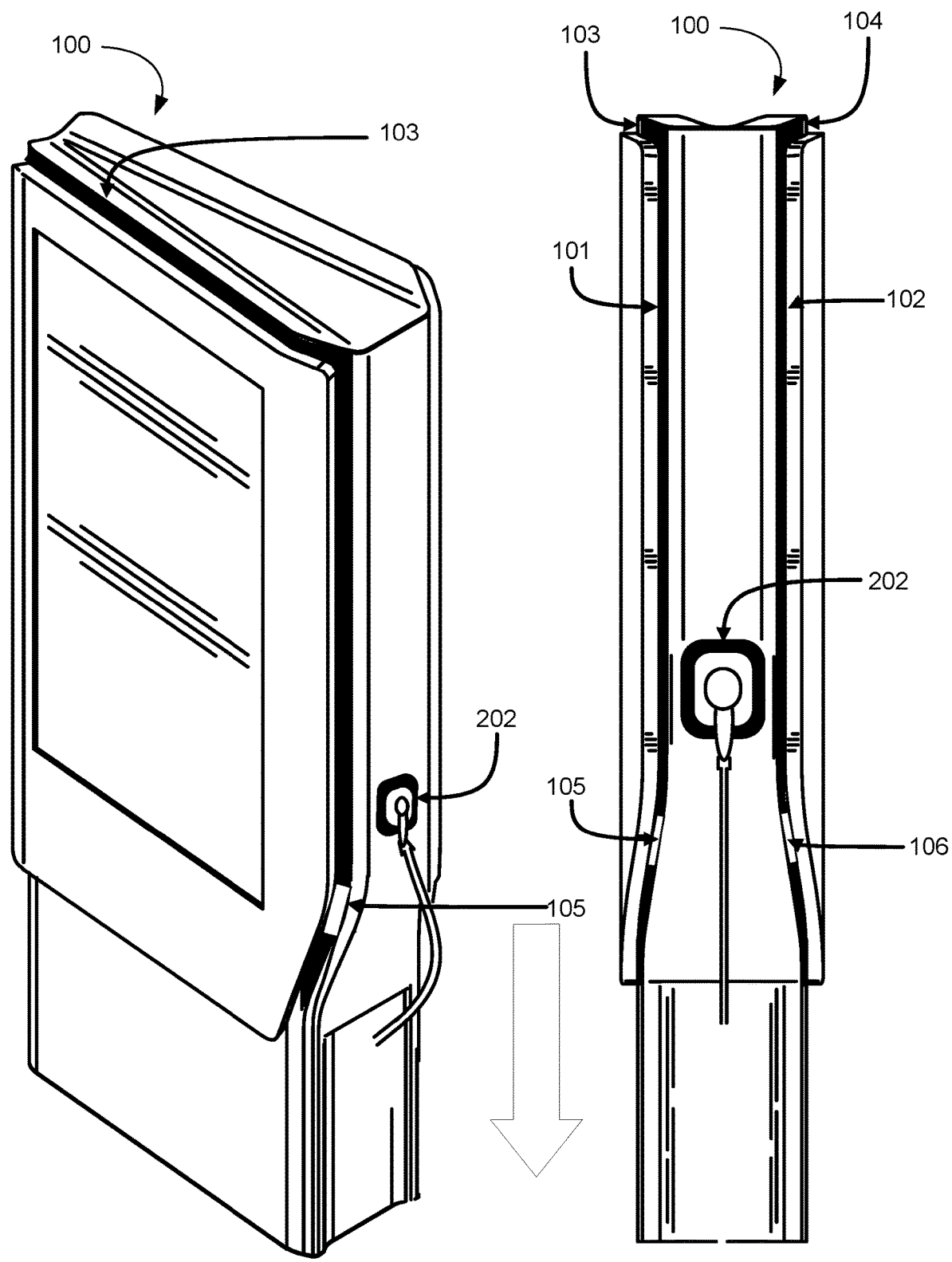

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

FIGS. 1A-1I illustrate various views of an electric vehicle charging station (EVCS) 100, in accordance with some embodiments. In some embodiments, the EVCS 100 includes a first vertical strip light source 101 and a second vertical strip light source 102. In some embodiments, the first vertical strip light source 101 is situated on a same side of the EV charging station as the second vertical strip light source 102 (e.g., the two vertical strip light sources are substantially aligned within a single vertical plane). In some embodiments, the first vertical strip light source 101 is situated on a side opposite the second vertical strip light source 102. For example, the vertical strip light sources are each at respective edges of a same side of the EV charging station.

In some embodiments, the EV charging station includes a first horizontal strip light source 104 and a second horizontal strip light source 103. For example, the first horizontal strip light source 104 and the second horizontal strip light source 103 are situated at a top of the EV charging station. Positioning the horizontal light strip at the top of the EV charging station allows the EV charging station to communicate its state with drivers that are not standing immediately next to the EV charging station. In some embodiments, the first horizontal strip light source 104 intersects with the first vertical strip light source 101. In some embodiments, the second horizontal strip light source 103 intersects with the second vertical strip light source 102.

In some embodiments, the strip light sources (e.g., vertical and horizontal) comprise rows of LEDs (e.g., colored LEDs). In some embodiments, the strip light sources can change brightness and/or color. For example, portions of the strip light sources change from dark blue to light blue (e.g., while the remaining portions of the strip light sources remain dark blue). In some embodiments, portions of the strip light sources can change brightness and/or color to create animations (e.g., movements) along the length of the strip light sources. In some embodiments, the first vertical strip light source and the first horizontal strip light source are the same LED string (e.g., comprise a continuous light source). In some embodiments, the first vertical strip light source comprises a first LED string and the first horizontal strip light source comprises a second LED string, distinct from the first LED string. Similarly, in some embodiments, the second vertical and horizontal strip light sources are the same LED string or separate LED strings. In some embodiments, each strip light source comprises a plurality of LED strings (a plurality of light sources).

FIGS. 1A-1I illustrate an example of the illumination of the light strip sources changing, over time, to create lighted animations. In some embodiments, the lighted animations indicate a first state of the EV charging station. For example, the first state corresponds to a state that the EV charging station is available for use. In some embodiments, the EV charging station determines a current state (or states) of the EV charging station (e.g., available for use, charging, unavailable, etc.). In some circumstances, providing lighted animations that change over time promotes efficiency of driver-charging station interactions by more effectively communicating the state of the charging station to a distant user (e.g., it may be easier to disambiguate an animation than static lighting).

For example, FIG. 1A illustrates a first state of the EV charging station. In some embodiments, the EV charging station remains in a neutral (e.g., starting) state. For example, when the charging station is idle (e.g., not indicating a state), the light sources illuminate a single color (e.g., a dark blue). In some embodiments, when the charging station is idle, the light sources do not change in color to create sequences of movement of sub-portions of the light sources.

In response to determining that the first state of the EV charging station is a state indicating the station is available for use (or in response to a determination that the state of the EV charging station has changed from unavailable to available for use), an animation of the vertical light strips is displayed. For example, the upper portion of the vertical light sources (e.g., portion 105 of vertical light strip 101 and/or portion 106 of vertical light strip 102) change state.

Figure 1G:
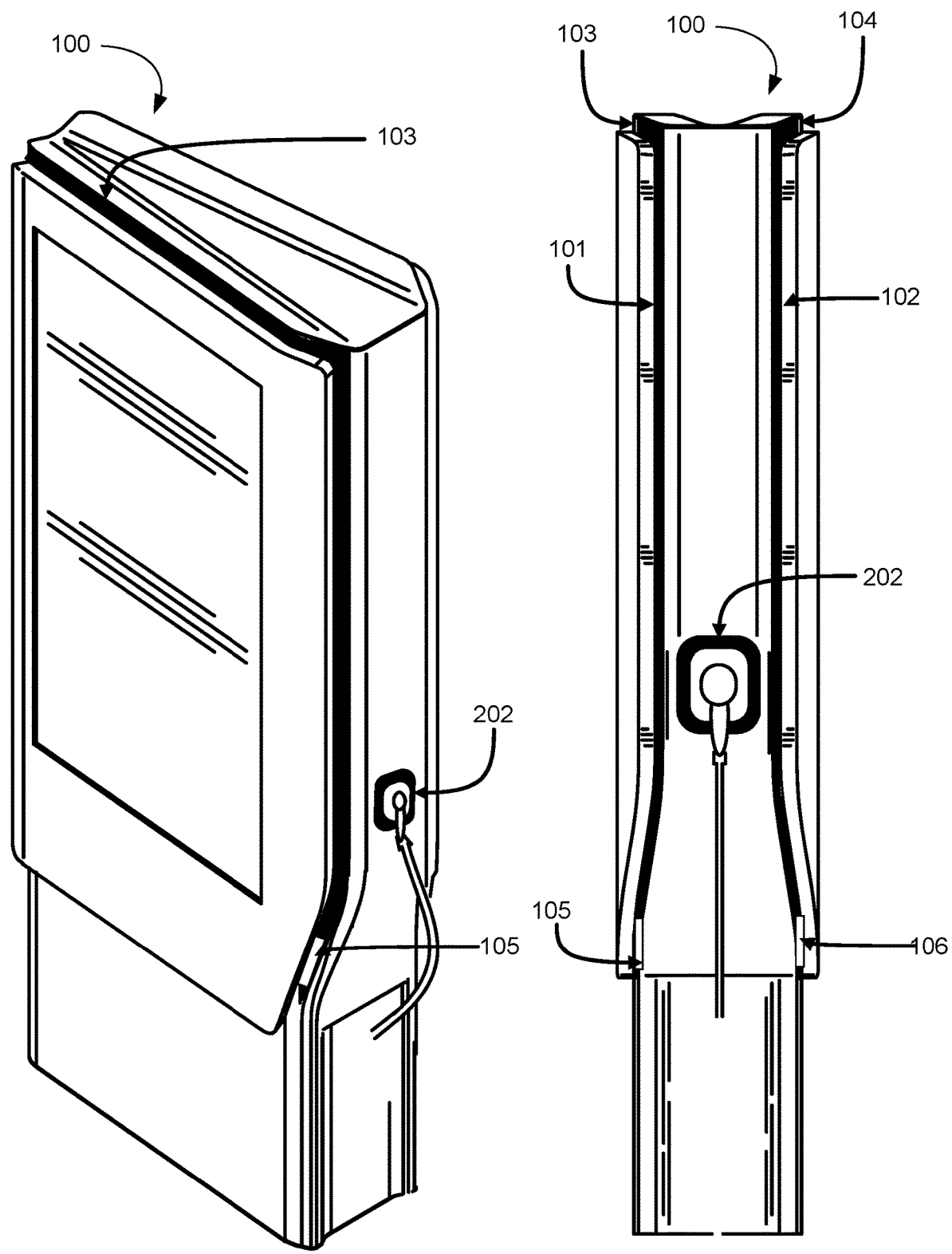
Figure 1H:
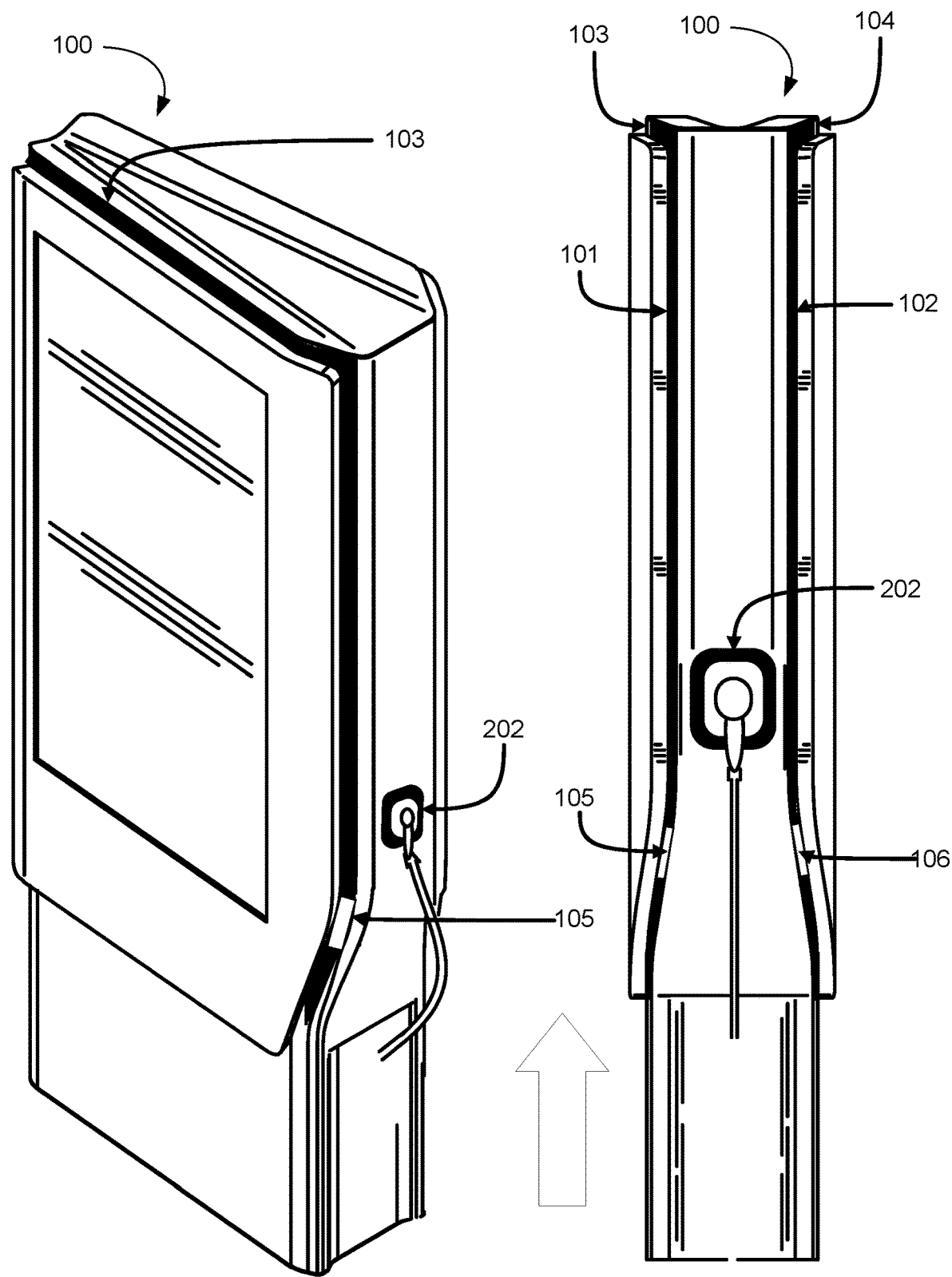
Figure 1I:
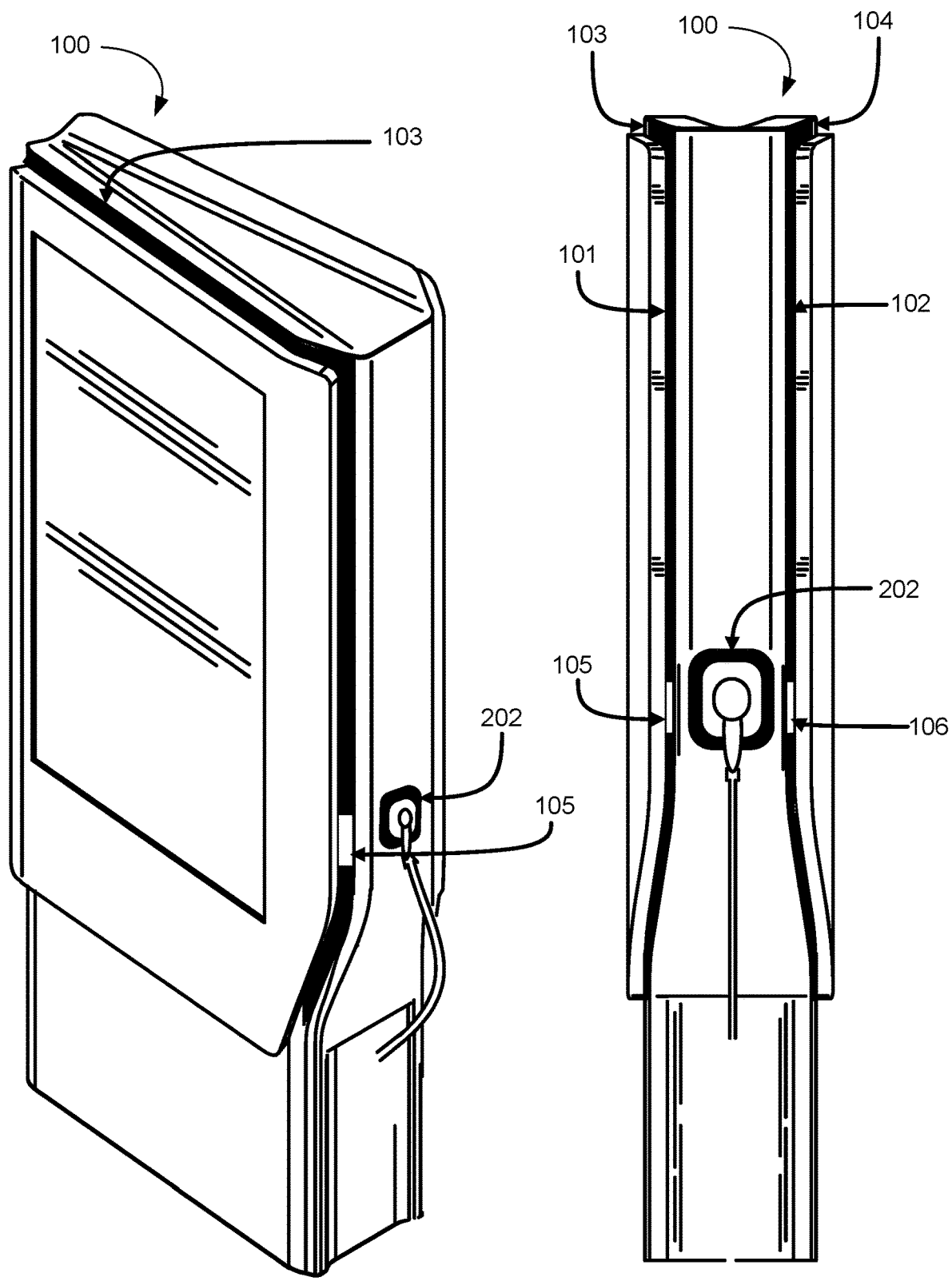
Figure 3A:
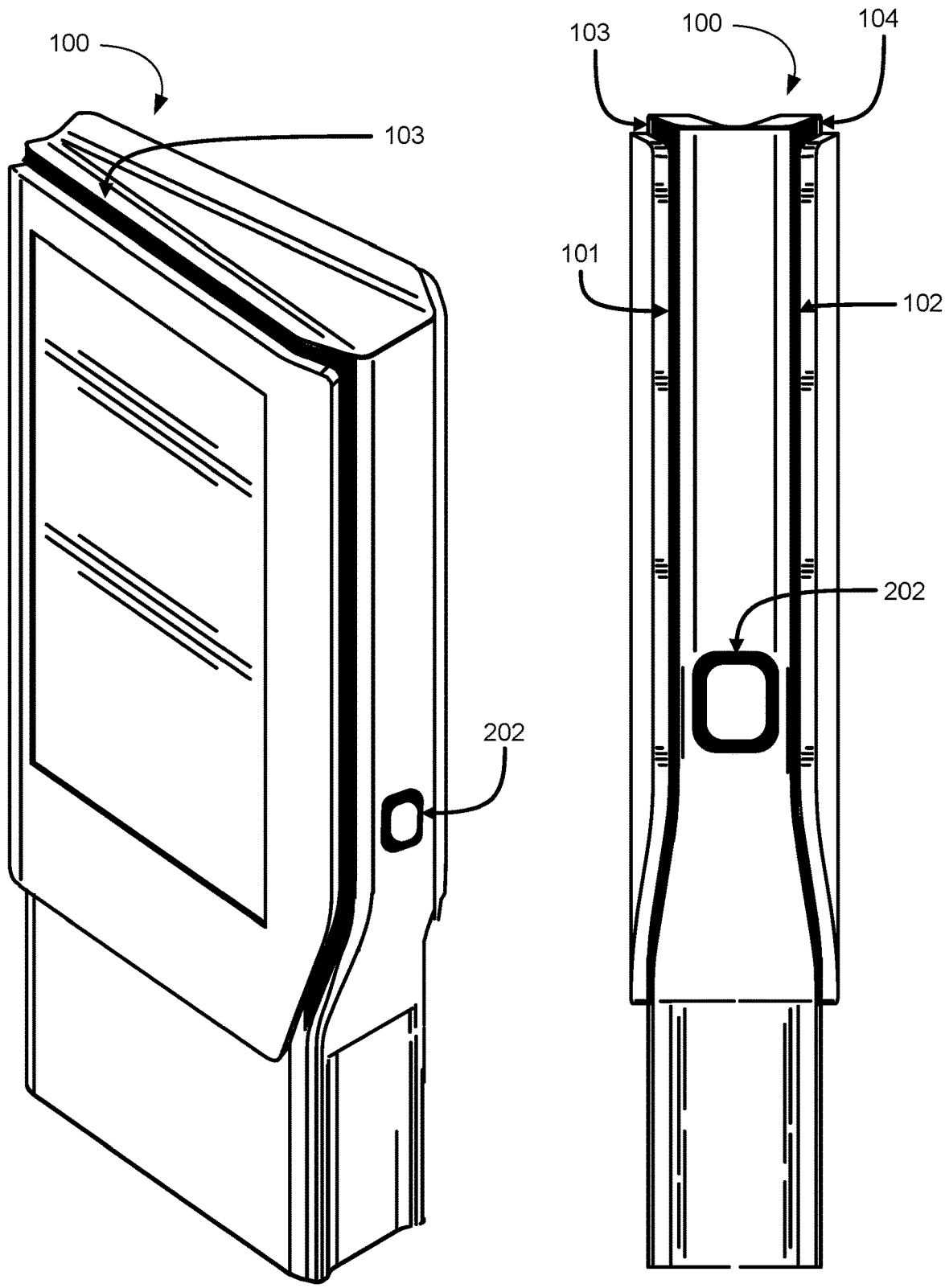
FIGS. 3A-3D illustrate animations and lighting of a charging station for an electric vehicle, in accordance with some embodiments.
Figure 3B:
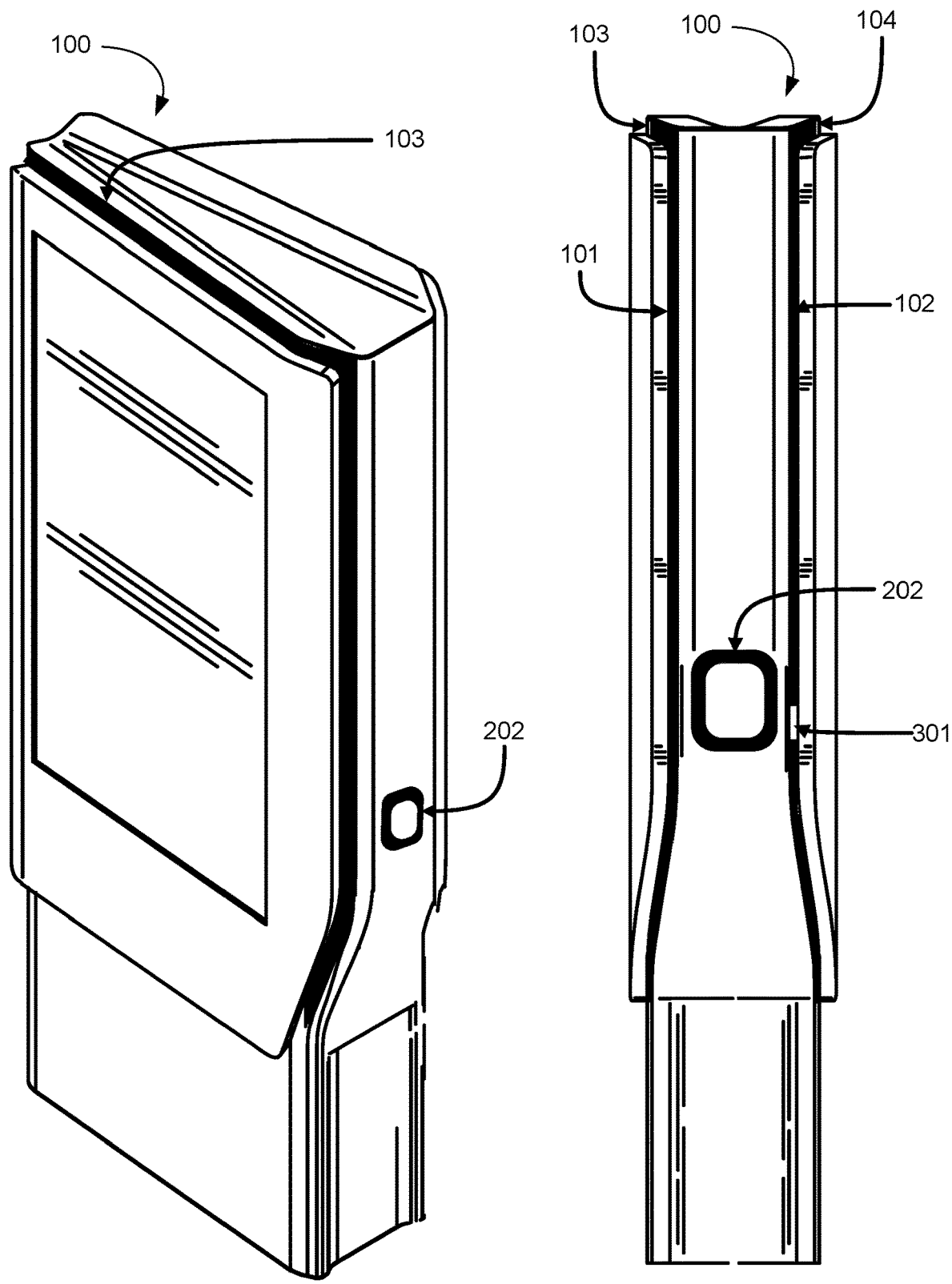
Figure 3C:
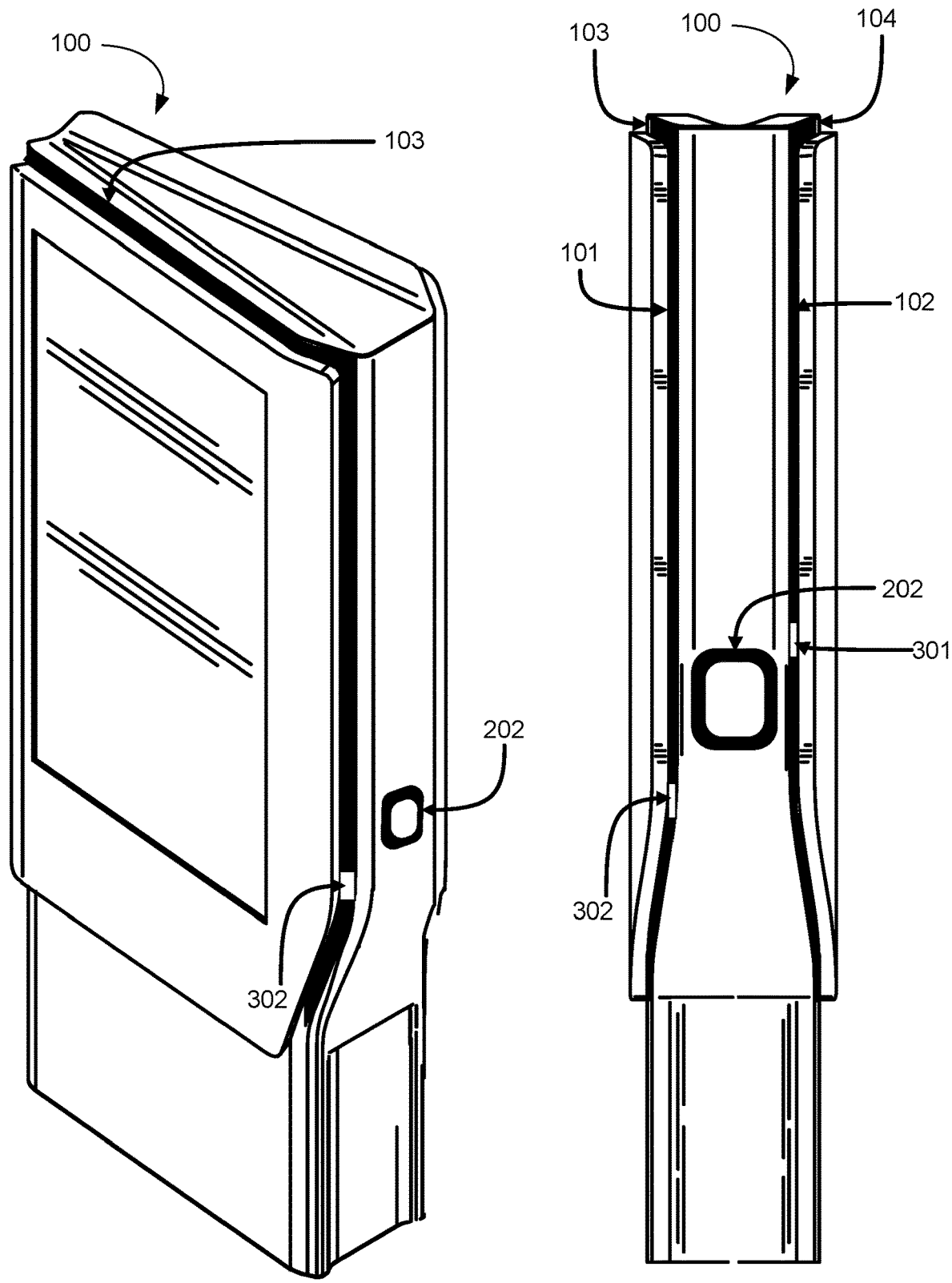

For example, the upper portion of the vertical light sources change in color (e.g., from a dark blue to a light blue color), while the remaining portion of the vertical light source (e.g., not portion 105 and/or portion 106) do not change state (e.g., do not change color, such as remaining dark blue). In some embodiments, portion 105 comprises a strip of LEDs that is a sub-portion of the vertical light strip 101 and portion 106 comprises a strip of LEDs that is a sub-portion of vertical light strip 106. In some embodiments, portion 105 and portion 106 are the same size (e.g., have the same length and/or number of LEDs). In some embodiments, the animation begins at the tops of the vertical strip light sources. Lower portions of the vertical light sources change successively, to make the portion 105 and portion 106 (e.g., the light blue portions) of the light source appear to move down the vertical light sources. In some embodiments, both the first vertical light source 101 and the second vertical light source 102 mirror each other (e.g., the same respective portions of each vertical light source change color at the same time). In some embodiments, the respective portions of the first vertical light source 101 and second vertical light source 102 are offset from one another. For example, as shown in FIG. 3C, the first vertical strip light source 101 includes a portion 302 (e.g., a colored portion, such as light blue) of the vertical strip that is a lower sub-portion of the respective vertical strip light source 101 than the portion 301 of the second vertical strip light source 102. To make the portion of the light strip source appear to travel down the vertical light strip sources, the LEDs change in a timed order. For example, FIG. 1B through FIG. 1F illustrate that the portions of the vertical strip light sources are moving down (e.g., as indicated by the center arrow) the vertical strip light sources. In some embodiments, the portions 105 and/or 106 (e.g., that are light blue (e.g., or a different color and/or shade)) appear to travel down the vertical strip light until, as shown in FIG. 1G, the portions 105 and/or 106 are at the bottom of the vertical strip light sources (e.g., and have been animated to appear to be traveling downward from where the portions are displayed in FIG. 1A). In some embodiments, the vertical strip light sources are animated to appear to be traveling upward. For example, FIG. 1G through FIG. 1I illustrate the animation traveling up the vertical strip light, as indicated by the center arrow pointing up in FIG. 1H.

In some embodiments, the animation is a continuous animation. For example, the next successive LEDs to change to a color matching the color of the portions 105 and/or 106 are located immediately beneath the lowest portion of the LED that has already turned to the color of portions 105 and/or 106 (e.g., rather than having the portions of the strip light source appear at random to produce a "jumping" animation where different (non-contiguous) portions of the strip change colors). Further, the highest portion of the LED that turned to the color of portions 105 and/or 106 turns back to the color of the rest of the vertical strip light source (e.g., to make the light blue/colored portion of the LEDs appear to be traveling downward (e.g., rather than turning the entire strip light blue/colored as the animation progresses)). In some circumstances, providing a continuous animation that changes over time promotes the efficiency of driver-charging station interactions by more effectively communicating the state of the charging station to a distant user (e.g., it may be easier to disambiguate an animation than static lighting). The plurality of different animation sequences promotes efficiency of the EV charging station itself by providing a user with feedback of a current state of the charging station.

In some embodiments, the animation further includes changes in the brightness of the vertical strip (and/or horizontal strip) light sources. In some embodiments, portions of the strip light turn different shades of a color (e.g., blue) to create a gradient (e.g., an ombre effect). For example, the strip source is not all one consistent color (e.g., with the sub-portion a light color blue compared to the rest of the strip source as a dark blue). Instead, the strip source is a darker shade of a color (e.g., or a different color) at the top of the vertical strip and gradually turns to a lighter shade of the color (e.g., or a different color) down the strip.

In some embodiments, after the portions 105 and/or 106 (e.g., the colored light sources) travel down the vertical strip light sources, the portions 105 and/or 106 travel back up, at least partially, the vertical strip light (e.g., to create a bounce effect where the colored light travels down, then bounces and travels back up the vertical strip light in the opposite direction). For example, FIG. 1H shows the colored portion (e.g., portion of the vertical strip light sources traveling back up the vertical strip (e.g., relative to FIG. 1G). In some embodiments, the light blue portion (e.g., portions 105 and/or 106) appears to travel only partially (e.g., less than a third) of the way up the strip before traveling back down to the bottom of the vertical strip light sources.

In some embodiments, at least a portion (or all) of the animation is repeated while the state of the EV charging station remains in the first state (e.g., available for charging). In some embodiments, the portions 105 and/or 106 are located next to a holder 202 of the charging station. For example, after repeating a portion (or all) of the animation for a predefined number of times (e.g., 3 times), the portions 105 and/or 106 stop moving up and down the strip light source and remain in a same location on the vertical strip light source. For example, the portions 105 and/or 106 remain in the position shown in FIG. 1I. In some embodiments, the animation is repeated until the EV charging station is no longer in the first state. For example, once the station is no longer available for charging, the portions 105 and 106 remain in the position shown in FIG. 1I.

Figure 2A:
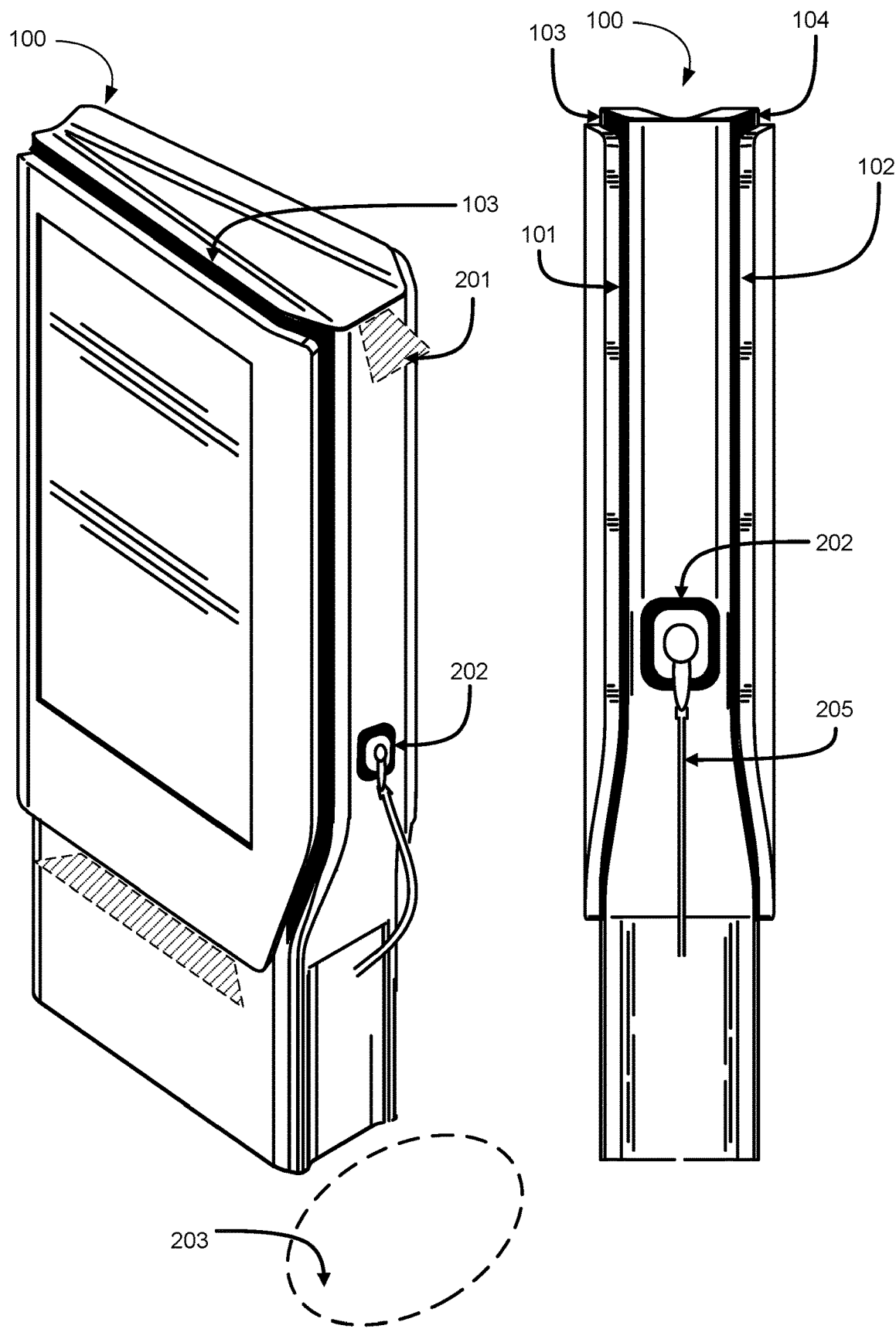
FIGS. 2A-2E illustrate animations and lighting of a charging station for an electric vehicle, in accordance with some embodiments.
Figure 2B:
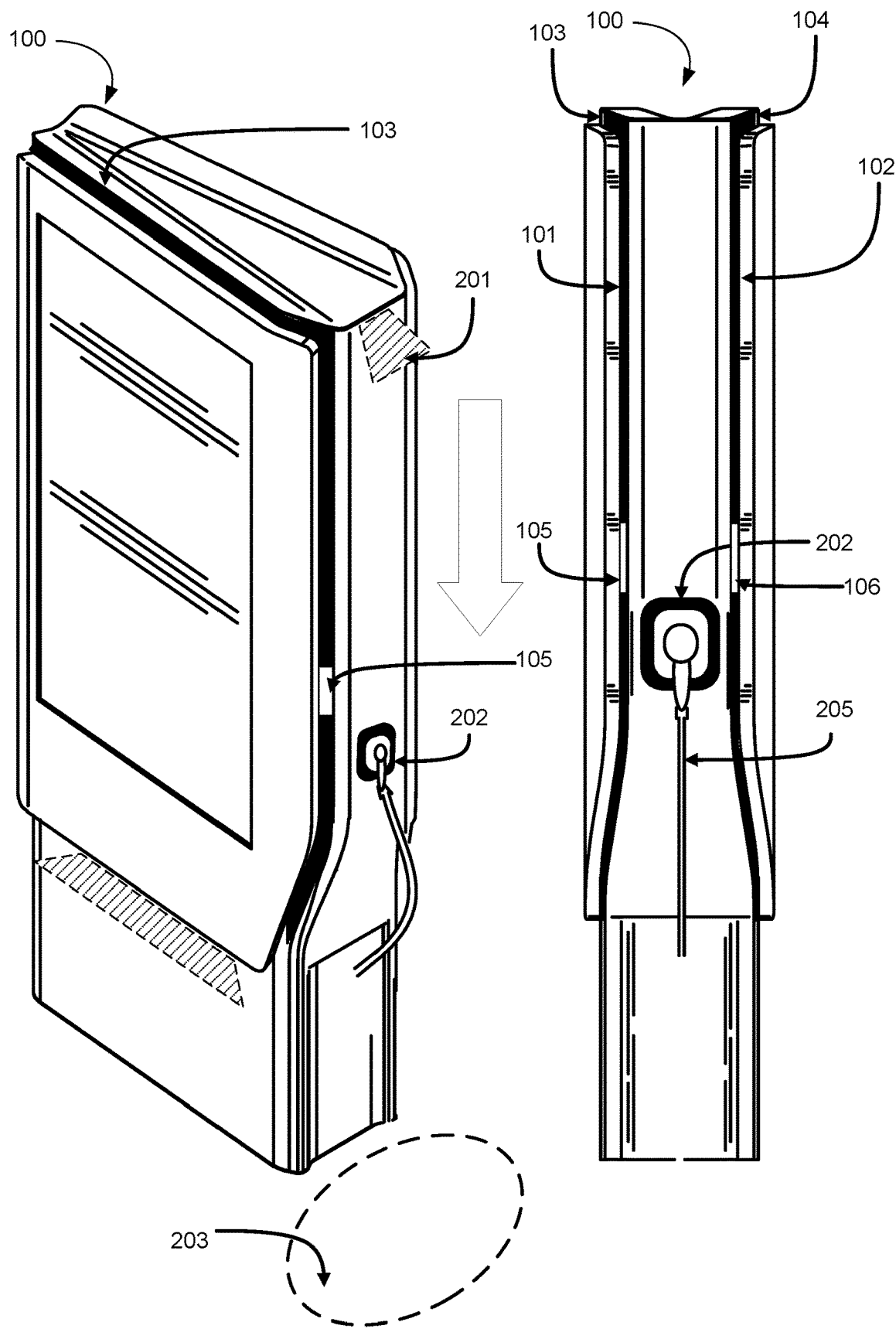

FIGS. 2A-2E illustrate an animation sequence performed in accordance with a determination that the EV charging station is in a second state. FIG. 2A illustrates the EV charging station. In some embodiments, the EV charging station further includes a spotlight source 201 (e.g., a light source positioned to illuminate a user area near the EV charging station). For example, the spotlight source 201 illuminates the area 203 (e.g., as illustrated between FIGS. 2B and 2C, the area 203 changes to a shaded area to show it is illuminated). In some embodiments, the spotlight source 201 changes a brightness level in response to determining different states of the EV charging station. In some embodiments, the spotlight source 201 illuminates the area 203 in response to a determination that a user is approaching the EV charging station. For example, using one or more sensors (e.g., sensor(s) 601), such as an optical sensor (e.g., a camera, proximity sensor, ambient light sensor, or the like), of the EV charging station, the charging station determines that a user is within a predefined geographic proximity to the EV charging station. In response to determining that the user is within the predefined geographic proximity, the spotlight source 201 turns on. Thus, in some circumstances, providing a spotlight that illuminates a larger area around the vehicle when the driver is nearby makes the drivers interactions with the charging station safer. In some embodiments, the area 203 changes in size in accordance with sensor data received by the optical sensor. For example, the area 203 gets larger (e.g., or smaller) when a user is determined to be closer to the charging station, as determined using the optical sensor.

In some embodiments, the EV charging station further includes a holder light source 202. For example, the holder light source 202 surrounds (e.g., encloses) an area in which a holder (e.g., a holster in which to store the charge delivery connector) is located. In some embodiments, the holder light source 202 is the shape of a ring around the holder. In some embodiments, the charge delivery connector (e.g., "charge gun") includes a cable 205 extending from the EV charging station. An example of a suitable connector is an IEC 62196 type-2 connector. In some embodiments, the charge delivery connector, when electrically coupled to an electric vehicle (e.g., by plugging the charge delivery connector into the EV), provides electric charging to the EV.

Figure 2C:
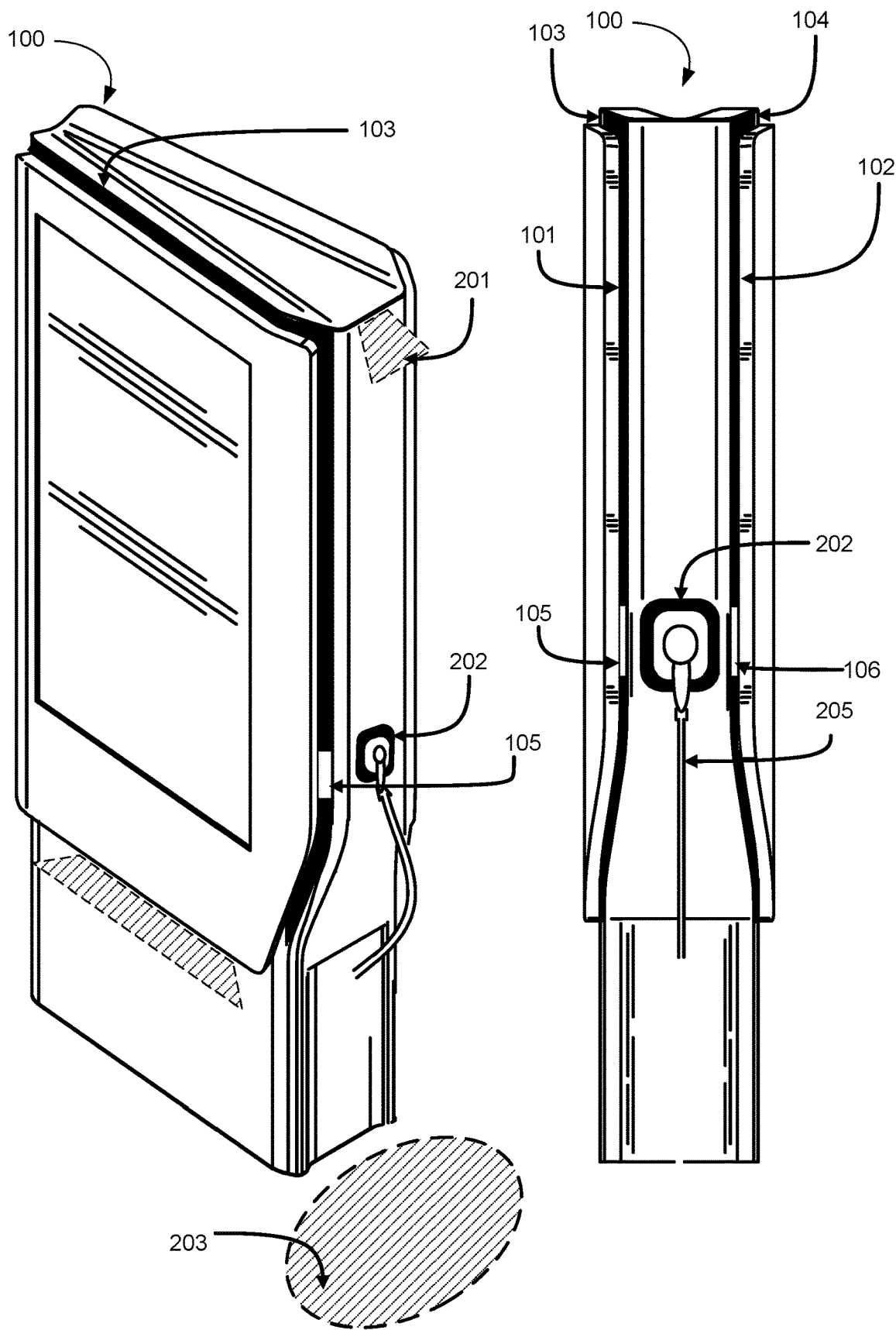
Figure 2D:
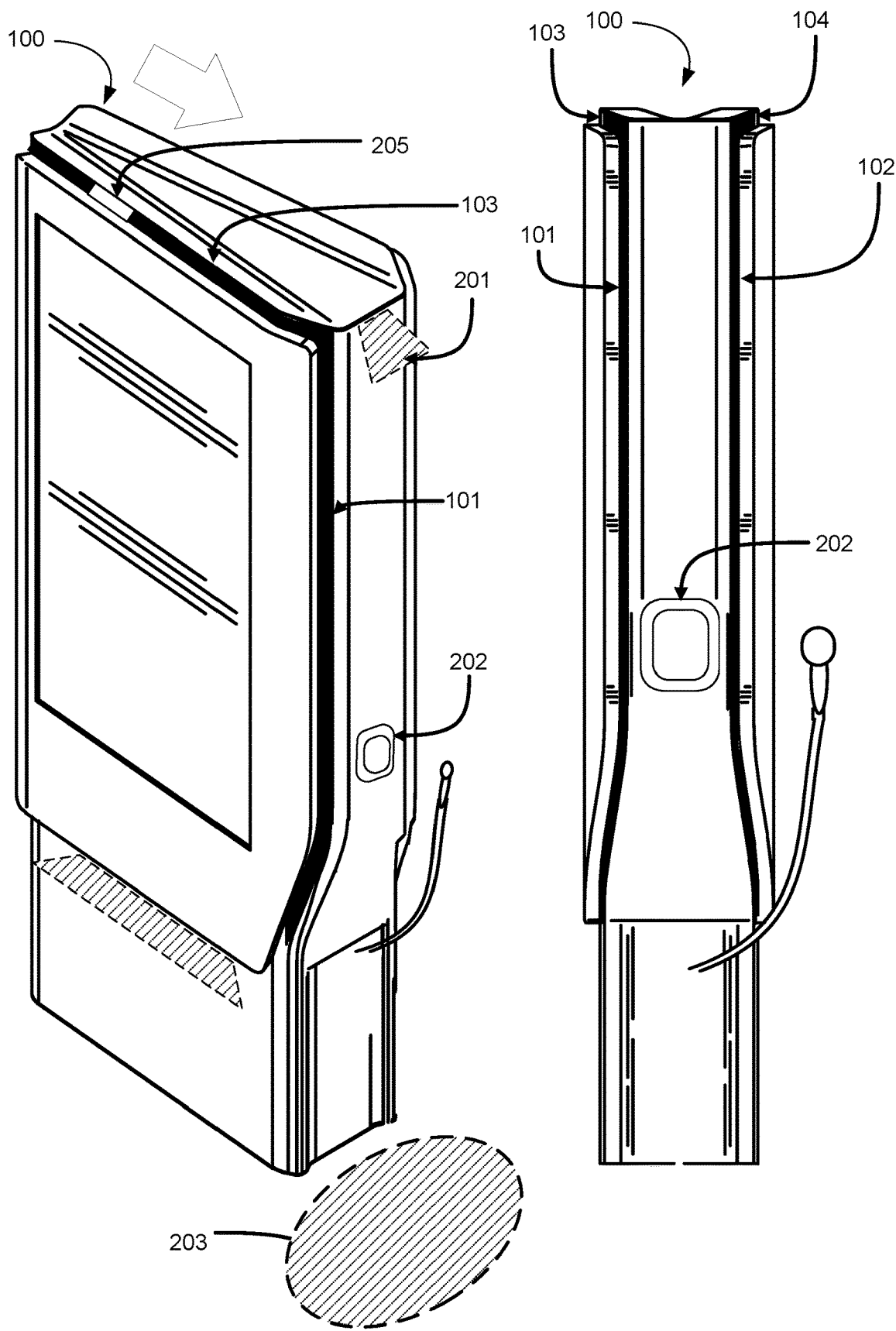

In some embodiments, the holder light source 202 is a strip light source (e.g., comprising a row of LEDs). In some embodiments, the holder light source 202 is enabled to change colors and/or brightness in accordance with a state of the EV charging station. For example, FIG. 2C illustrates the holder light source 202 is black, indicating that the light source is in a first state (e.g., having a first color and/or not illuminated). In some embodiments, in response to the state changing from a first state to a second state (e.g., when a charge gun has been removed from the holder, as illustrated in FIG. 2D), the holder light source 202 changes its state (e.g., by changing colors and/or changing from dark to illuminated), as shown in FIG. 2D, where the holder light source 202 is white, compared to FIG. 2C where the holder light source 202 is black. In some embodiments, the holder light source 202 is white. For example, the holder light source 202 changes state by going from the light sources off to the light sources on. When the light source is on, it is illuminated as a color (e.g., white). In some embodiments, the holder light source 202 is a color different than the color(s) of the vertical and horizontal strip light sources.

In some embodiments, the state of the EV charging station is a state indicating that a charge gun has been removed from the holder. In some embodiments, the state of the EV charging station is a state represented by one of the states illustrated in FIGS. 5A-5B.

In some embodiments, the animation begins by, in accordance with a determination that the EV charging station is in the second state (e.g., the charge gun has been removed), changing the colors and/or brightness of the vertical and horizontal strip light sources. For example, the color is changed from a first shade of blue to a second shade of blue. In some embodiments, the light animation is facilitated by portions of the horizontal and vertical strip lights sources changing to light blue. For example, similar to the animation described in FIGS. 1A-1I, the animation appears to have the portions of the strip light source (e.g., portions 105 and/or 106) travel down the vertical light strip sources. In some embodiments, the animation begins, as shown in FIG. 2D, by having a portion 205 of the horizontal light strip turn from a first color to a second color (e.g., from dark blue to light blue) and appear to travel toward the respective vertical light strip source 101 that intersects with the horizontal strip light source. For example, the portion 205 continuously travels across the horizontal strip light source until it meets the vertical light strip source 101, and then portion 105 continues down the vertical strip light source 101.

Figure 2E:
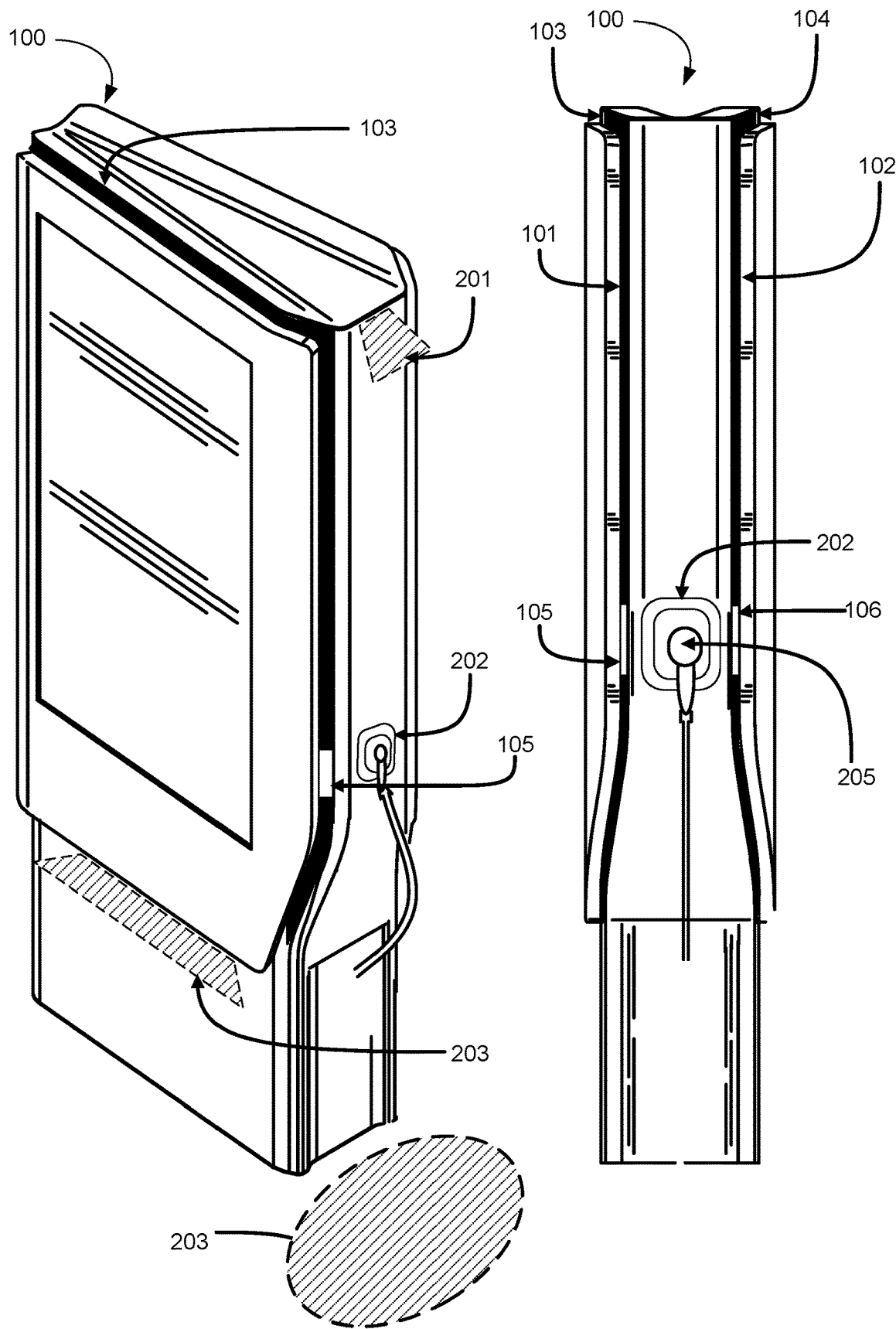

In some embodiments, to indicate a state of the electric vehicle charge station, such as a state indicating that the charge gun has been (e.g., or should be) removed by the user, the portions 105 on the vertical strip light sources travel down the vertical strip light sources until the portions align with an area next to the holder, as illustrated in FIG. 2E. For example, while FIG. 2E depicts the charge gun is still in the holder, the sequence of lights may be programmed to begin a particular sequence based on different states of the electric vehicle charging station (e.g., when the gun has already been removed from the holder).

In some embodiments, as the portions 105 on the vertical strip light sources are animated (e.g., moving), the holder light source 202 is simultaneously illuminated, as illustrated in FIG. 2E. For example, FIG. 2E illustrates portions 105 and 106 on the vertical strip light sources, while the holder light source 202 is also illuminated (e.g., shown by holder light source 202 changing from black to white between FIGS. 2C and 2E). In some embodiments, the holder light source 202 changes color (or brightness) during the animation for the second state of the electric vehicle charging station. In some embodiments, providing a lighted animation of the holder light source 202 improves the efficiency of the driver-charging station interaction by letting the driver know that the charger is working properly, or has been returned properly to its holder. The latter advantage decreases the risk of damage to the charging gun by assuring that it is properly returned to its holder after use (e.g., and not left dangling).

In some embodiments, once the vertical strip light sources are aligned with the area next to the holder, spotlight 201 is illuminated (e.g., turns on), as shown in FIG. 2C. In some embodiments, the spotlight 201 fades in (e.g., starts off less bright and becomes brighter) to illuminate a larger area 203. FIG. 2E also illustrates the portions 105 and 106 (e.g., light blue portions) of the vertical strip light sources next to the holder area (which is illuminated by holder light source 202). In some embodiments, the holder light source 202 illuminates a color distinct from the color(s) of the vertical strip light sources.

In some embodiments, after the animation pauses (e.g., with the portions 105 and 106 of the vertical strip light sources next to the holder area), the animation continues with the portions 105 and/or 106 traveling down to the bottom of the vertical strip light sources and back up (e.g., to the top of) the vertical strip light sources, as described with reference to FIGS. 1A-1I.

Figure 3D:
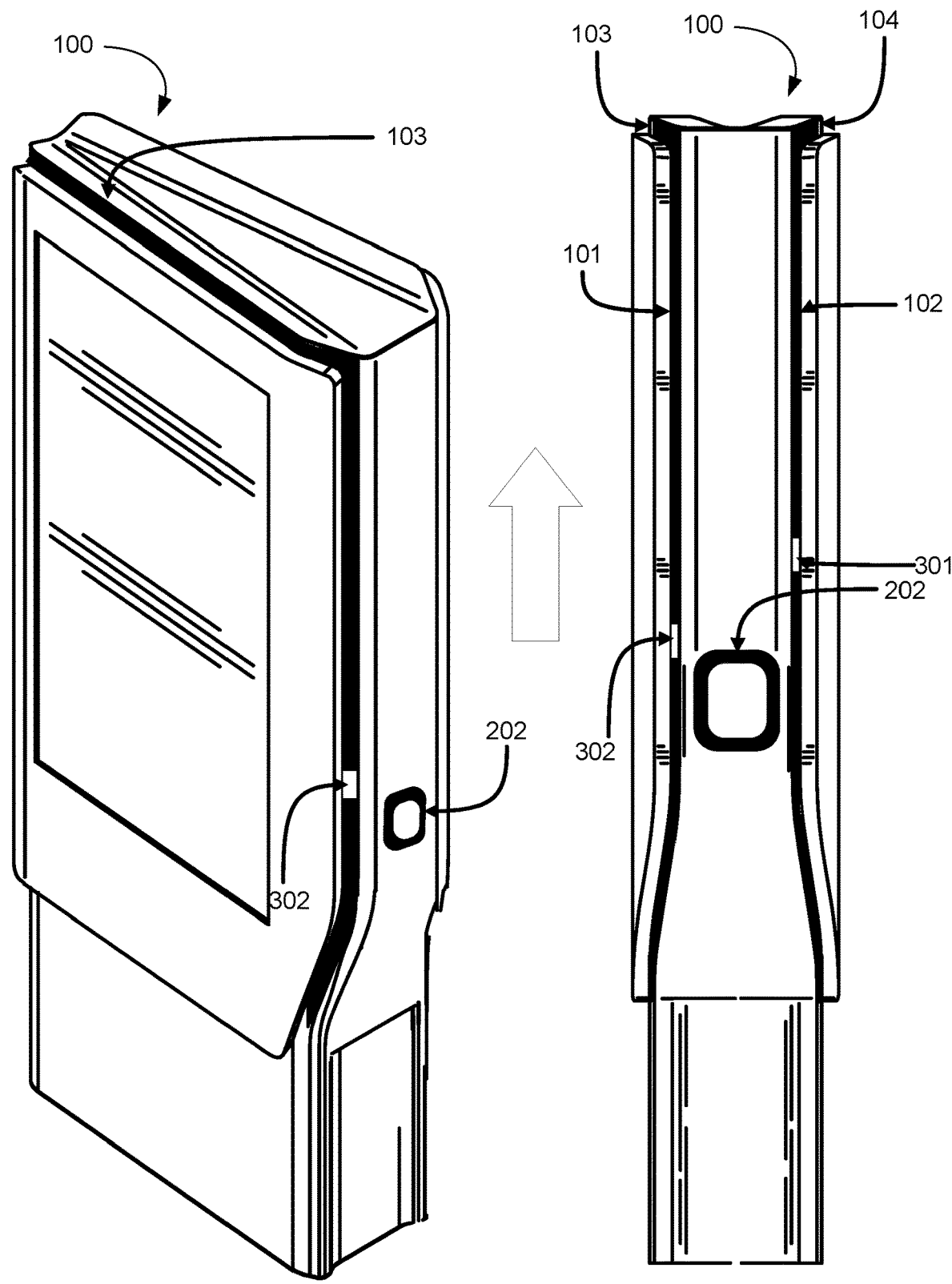

FIGS. 3A-3D illustrate an animation sequence performed in accordance with a determination that the EV charging station is in a third state. The animation includes portions of the light strip sources changing, over time, to create light animations. In some embodiments, the state of the EV charging station is a state indicating that the charging station is delivering a charge to an electric vehicle (e.g., FIGS. 3A-3D does not show the charge gun or cable to illustrate the charge gun is removed from the holder). In some embodiments, the charge gun is plugged into an electric vehicle and the EV charging station recognizes that charge is flowing from the EV charging station to the electric vehicle. In some embodiments, the animation comprises a portion (e.g., portions 301 and/or 302) of the vertical strip light sources changing color (e.g., from a dark blue to a light blue) and appearing to travel up the vertical strip light source (e.g., starting from the bottom of the vertical strip light source), as illustrated in FIG. 3D.

In some embodiments, the animation includes fading in and fading out of the light sources. In some embodiments, animations involving fading in and fading out use differences in brightness to show "fading." For example, the animations comprise alternating between illuminating the lights between multiple colors (e.g., or shades). In some embodiments, the animations use a size of the portion that changes color (e.g., to light blue) to show "fading" (e.g., starting with a smaller size of a portion and transitioning to a larger size of a portion to show fading in). For example, the size of portions 301 and/or 302 gradually increase to take up a larger portion of the strip light source to show "fading in." In some embodiments, the animation comprises portions 301/302 traveling only partially up the vertical strip light source (e.g., stopping at an area near the holder light source and not going to the top of the vertical strip light source).

Figure 4A:
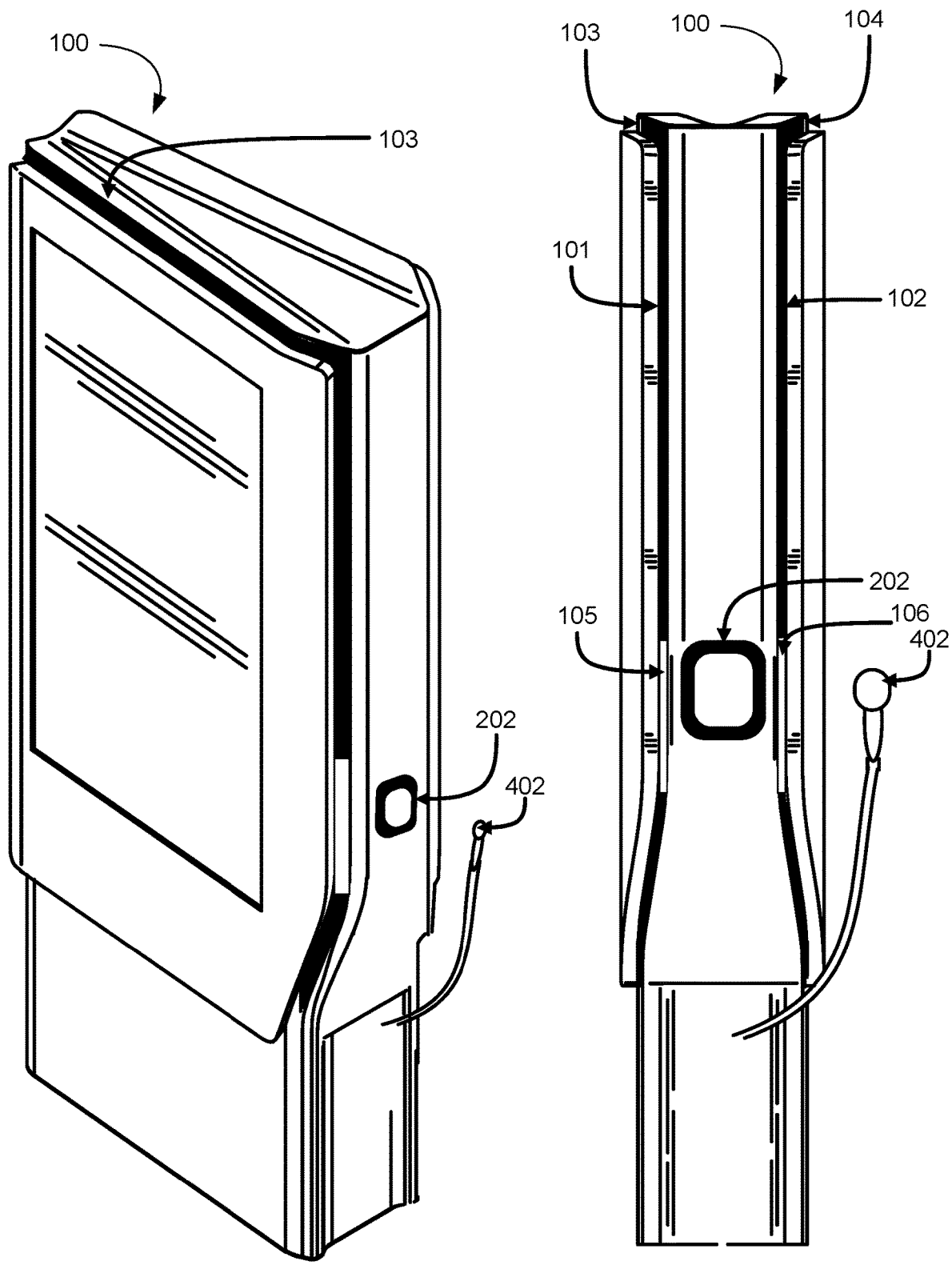
FIGS. 4A-4B illustrate animations and lighting of a charging station for an electric vehicle, in accordance with some embodiments.
Figure 4B:
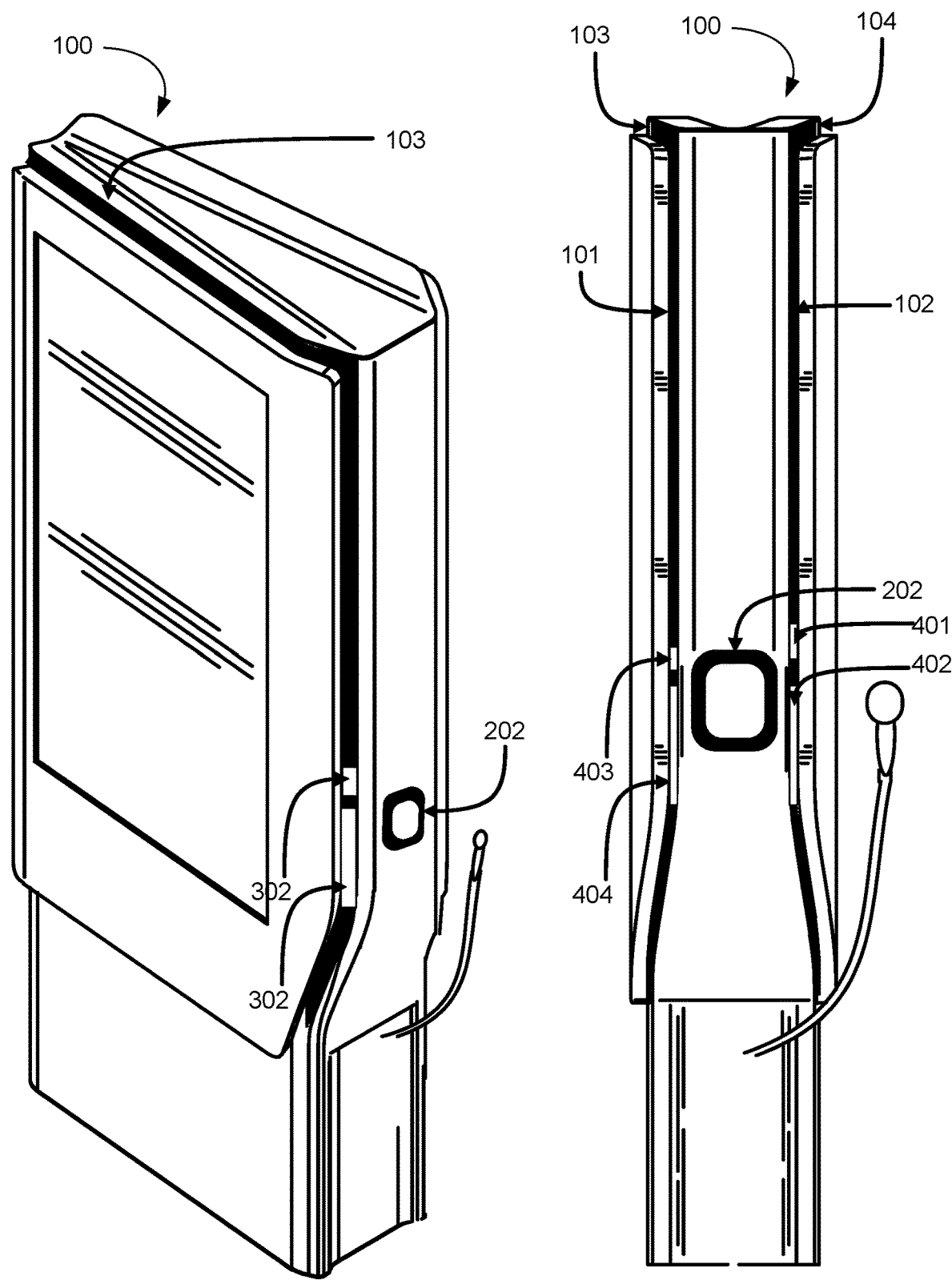

FIGS. 4A-4B illustrate an animation sequence performed in accordance with a determination that the EV charging station is in a fourth state, in accordance with some embodiments. In some embodiments, the fourth state of the EV charging station is a state indicating that the charge gun has been removed from an electric vehicle and has been returned to the holder. For example, FIGS. 4A-4B illustrates that the charge gun has been removed from the holder (e.g., but not plugged into an electric vehicle). It will be understood that the sequence of animations described with reference to FIGS. 4A-4B also apply to other states of the EV charging station, such as once the charge gun has been put back into the holder.

In some embodiments, the animation comprises a plurality of portions of each vertical strip light source changing colors (and/or brightness). For example, as illustrated in FIGS. 1A-1I, a single portion (e.g., portion 105 and 106, respectively) of each of the vertical strip light sources 101 and 102 has a different color than the remaining portion of the vertical strip light sources 101 and 102 (e.g., the portion 105 and portion 106 each have a light blue color and the rest of the vertical strip is a dark blue). FIGS. 4A-4B shows a stage of the animation in which the single portion of the light strip appears to separate into two distinct sub-portions on each vertical strip light source. For example, instead of a single portion 105 on the vertical strip light source 101 (shown in FIG. 4A), one of the sub-portions appears to travel up (e.g., portion 403) the vertical strip light source, while the other sub-portion (e.g., portion 404) appears to stay in a same location (shown in FIG. 4B). In some embodiments, the sub-portions are different sizes. Similarly, instead of a single portion 106 on the vertical strip light source 102, one of the sub-portions appears to travel up (e.g., portion 401) the vertical strip light source, while the other sub-portion (e.g., portion 402) appears to stay in a same location In some embodiments, both sub-portions (e.g., both portion 403 and portion 404) are animated to move up and/or down the vertical strip light source. In some embodiments, only one of the sub-portions moves along the vertical strip light source. In some embodiments, more than two sub-portions are generated. In some embodiments, the sub-portions are recombined into a single sub-portion during the animation (e.g., portions 403 and 404 appear to merge together into a single portion, such as portion 105).

In some embodiments, the spotlight source 201 is also turned on (and/or off) during the animation sequences of the vertical and horizontal strip light sources. In some embodiments, the spotlight source 201 is programmed to turn on (and/or off) and/or to change brightness in accordance with the various states of the EV charging station.

One of ordinary skill in the art, having the benefit of this disclosure, will understand that a plurality of different charging states can cause the EV charging station to provide different combinations of the animations, including those described above. In some embodiments, sequences of the animations described above are performed at the charging station in accordance with the charging station changing between different states.

Figure 5A:
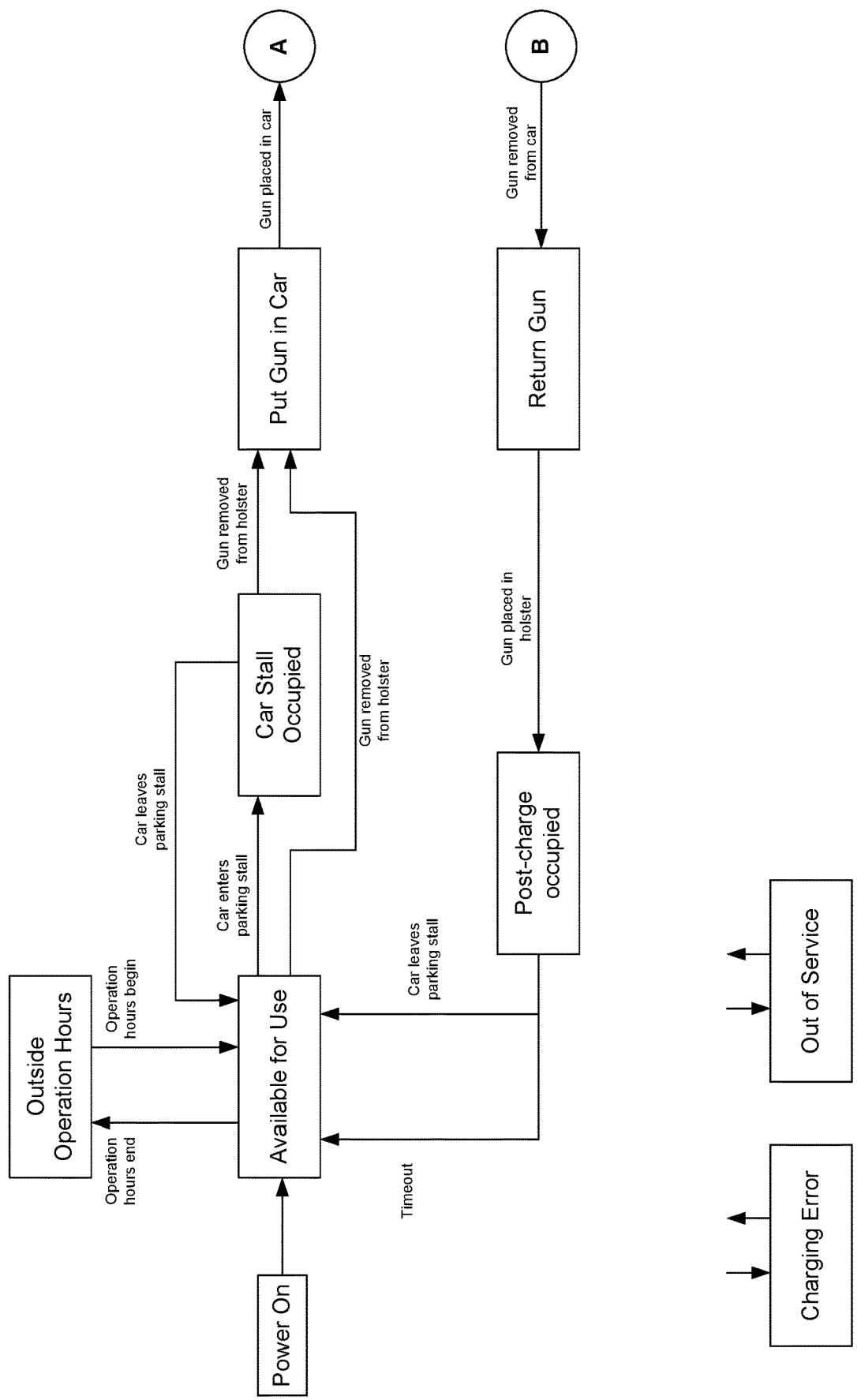
FIGS. 5A-5B illustrate a flowchart illustrating different states of a charging station for an electric vehicle, in accordance with some embodiments.
Figure 5B:
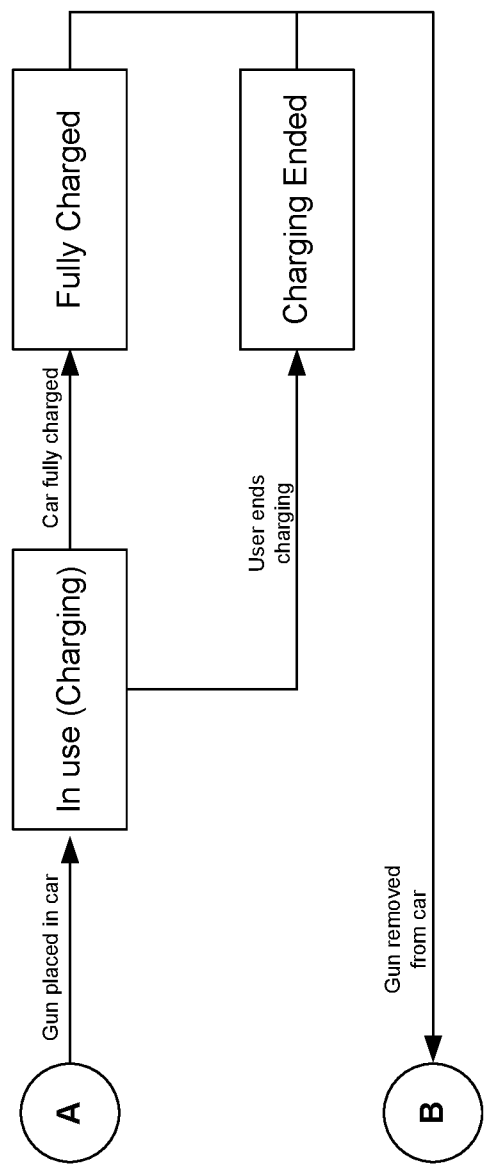

FIGS. 5A-5B depict a flowchart illustrating different states of a charging station for an electric vehicle. Starting with a "Power on" for the electric vehicle charging station, the possible states include, "available for use," "car stall occupied," "post-charge occupied" (e.g., where a user is still at the charging station but it is no longer charging), "put gun in car" (e.g., prompting, through animation, the user to insert the charge gun into the vehicle after the user has disconnected it from holder of the EVCS), "return gun" (e.g., prompting, through animation, the user to insert the charge gun back into the holder after the user has disconnected it from the EV), "in use (charging)" (e.g., a user is charging a vehicle), "fully charged" (e.g., a user has not returned the charge gun or disconnected it from the electric vehicle, but charging is complete), and "charging ended" (e.g., based on expiration of a predefined time period; the vehicle is not necessarily fully charged). Other states include "outside operating hours" (e.g., and the charging station is unavailable), "charging error" and "out of service." In some embodiments, each state (or status, which may be a combination of states) is indicated with a different or distinct lighting scheme or animation, as described elsewhere in this document.

In some embodiments, the indicated state selected from the group of states consisting of: a state indicating that the charging station is not currently occupied by an electric vehicle and is capable of providing service, a state indicating that the charging station is currently occupied by an electric vehicle, a state indicating that the charging station is out of service, a state indicating that a charge gun has been removed from a holder of the charging station but not connected to an electric vehicle, a state indicating that the charge gun has been removed from the holder and is connected to an electric vehicle without delivering a charge, a state indicating that the charge gun is connected to an electric vehicle and is delivering a charge, a state indicating that the charge gun is connected to an electric vehicle and has completed charging, a state indicating that the charge gun has been removed from an electric vehicle but has not been placed into the holder, and a state indicating that the charge gun has been returned to the holder.

In some embodiments, the lighting methods and devices described herein indicate a status that includes at least two of the states concurrently. For example, the lighting of the charging station will concurrently indicate both (1) a state indicating that the charging station is currently occupied by an electric vehicle and (2) a state indicating that the charge gun is connected to an electric vehicle and is delivering a charge.

In some embodiments, the charging station includes one or more optical sensors (e.g., cameras) and the charging station determines the state of the charging station using the one or more optical sensors (e.g., as described in U.S. patent application Ser. No. 15/954,476, entitled "Systems and methods for providing targeted advertisements to a charging station for electric vehicles," which is hereby incorporated by reference in its entirety).

Figure 6:
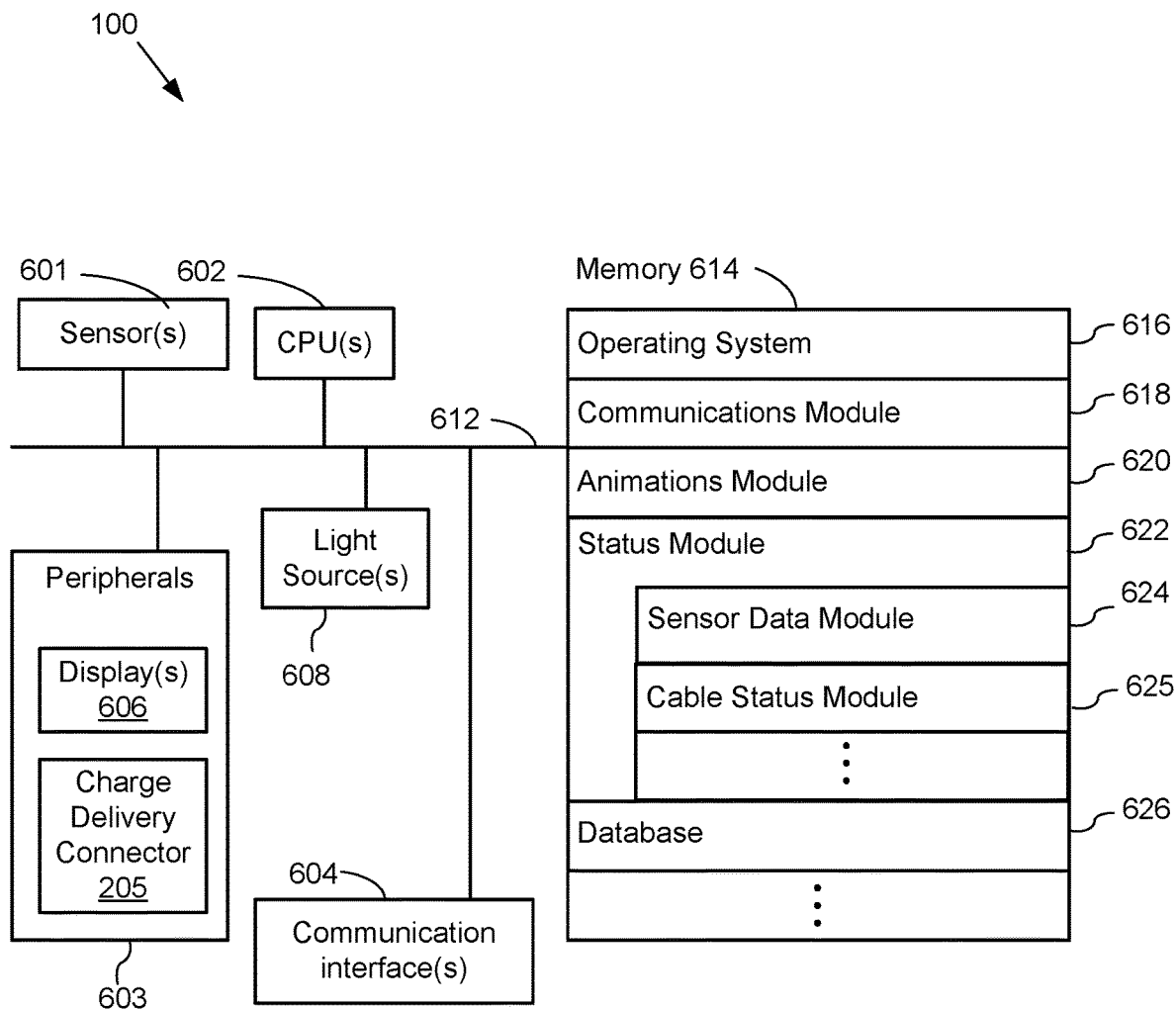
FIG. 6 illustrates a block diagram of a charging station for an electric vehicle, in accordance with some embodiments.

FIG. 6 illustrates a functional block diagram of EVCS 100. In some embodiments, the components of EVCS are enclosed within a frame. In some embodiments, the EVCS 100 comprises a peripherals 603 that includes a charge delivery connector 205 (e.g., cable) for providing electrical power to an electric vehicle and one or more display(s) 606 for displaying content. The EVCS 100 further includes one or more processors (e.g., CPU(s) 602) and one or more sensor(s) 601 (e.g., optical sensors, RF sensors, etc.). In some embodiments, the EVCS comprises one or more light sources 608 (e.g., LED strips, spotlights, etc.). In some embodiments, the light sources 608 are distinct from the display 606. In some embodiments, the light sources 608 do not form a display. The EVCS further comprises a computer system that includes memory 614 storing instructions for operating the EVCS. The memory 614 is coupled to the one or more sensors, CPUs, displays, and light sources through one or more communication interface(s) 604 that are coupled to the memory 614 via one or more communication bus(es) 612. For example, the memory 614 includes:

Operating system 616 which includes procedures for handling various basic system services and for performing hardware dependent tasks;

Communications module 618 which is used for connecting to other electric vehicle charging stations and/or other devices (e.g., including a user's device) via the one or more communication network interfaces (wired or wireless) and one or more communication networks, such as the Internet, other wide area networks, local area networks, metropolitan area networks, and so on;

Animations module 620 for storing animation sequences and/or causing the one or more display(s) and/or light source(s) to operate according to the stored animation sequences;

Status module 622 for monitoring a state of the EVCS, for example whether the EVCS is available, in use (e.g., plugged into an electric vehicle), charging (e.g., providing charge to an electric vehicle), etc. In some embodiments, the status module includes:

sensor data module 624 for processing data received by the one or more sensors coupled to the EVCS, and cable status module 625 for determining a current status of the charge delivery connector 205 (e.g., cable) for the EVCS; and Database 626 for storing data, such as content to be displayed on the display(s) 606 and/or storing electric vehicle information and/or information related to users associated with electric vehicles.

In some embodiments, the one or more sensor(s) 601 include one or more of: an optical sensor (e.g., infrared and/or red, green, blue "IR/RGB" camera), a near-field communication (NFC) sensor for communicating with one or more nearby user devices, a motion sensor (e.g., a passive infrared (PIR) sensor), a radiofrequency and/or infrared (RF/IR) sensor, an ultrasound sensor, a depth sensor, a heat IR sensor, and radar.

In some embodiments, communications module 618 is used to connect the EVCS to a network that includes a plurality of additional EVCSs. In some embodiments, communications module 618 is further used to communicate with one or more server systems located remotely from the EVCS. In some embodiments, communications module 618 shares data and information (e.g., stored in database 626) with other EVCSs on the shared network and/or the one or more server systems.

In some embodiments, the memory 614 includes high-speed random access memory, such as DRAM, SRAM, DDR RAM or other random access solid state memory devices. In some implementations, the memory 614 includes non-volatile memory, such as one or more magnetic disk storage devices, optical disk storage devices, flash memory devices, or other non-volatile solid state storage devices. In some implementations, the memory 614 includes one or more storage devices remotely located from the CPU(s) 602. The memory 614, or alternatively the non-volatile memory device(s) within the memory 614, comprises a non-transitory computer-readable storage medium. Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 614 stores a subset of the modules and data structures identified above. Furthermore, the memory 614 may store additional modules or data structures not described above.

Although FIG. 6 shows an EVCS 100, FIG. 6 is intended more as a functional description of the various features that may be present rather than as a structural schematic of the implementations described herein. In practice, and as recognized by those of ordinary skill in the art, items shown separately could be combined and some items could be separated.

Figure 7A:
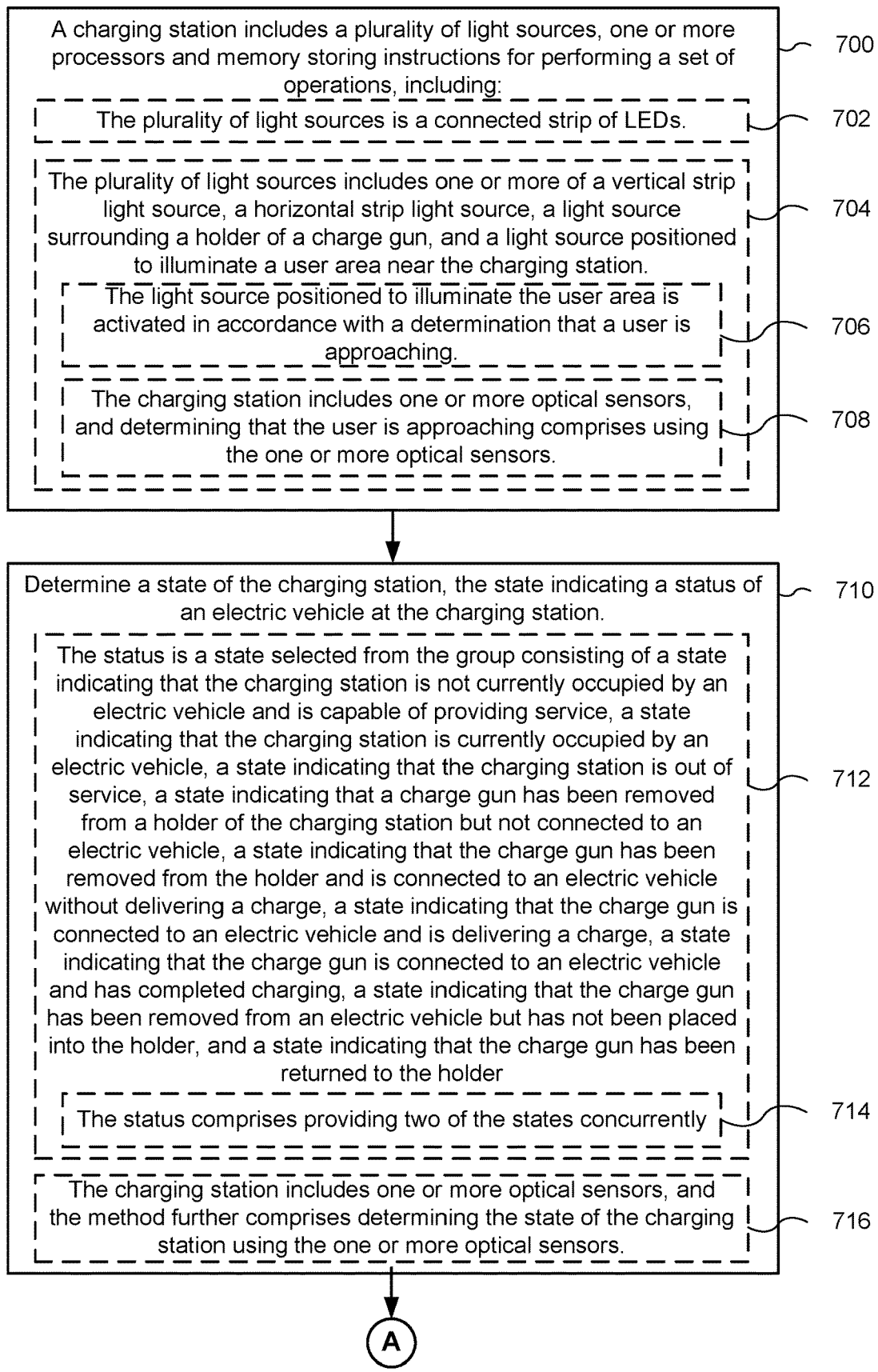

FIGS. 7A-7B illustrate method performed at a charging station for an electric vehicle. The charging station for an electric vehicle includes (700) a plurality of light sources, one or more processors and memory storing instructions for performing a set of operations. In some embodiments, the plurality of light sources is distinct from a display of the charging station. In some embodiments, the plurality of light sources do not form a computer display.

In some embodiments, the plurality of light sources is (702) a connected strip of LEDs. In some embodiments, the plurality of light sources include one or more light sources on a parameter of the charging station. In some embodiments, the plurality of slight sources include one or more light sources at least 1.5 meters off the ground (e.g., to increase the extent to which the animations are visible to drivers who are not yet at the charging station).

In some embodiments, the plurality of light sources includes (704) one or more of a vertical strip light source, a horizontal strip light source, a light source surrounding a holder of a charge gun (e.g., light source 202), and a light source positioned to illuminate a user area near the charging station (e.g., light source 201 for illuminating area 203). In some embodiments, the plurality of light sources includes any subset of the aforementioned light sources. For example, a vertical strip light source 101 and/or 102 is described above with reference to FIGS. 1A-1I. For example, a horizontal strip light source 103 and/or 104 is described above with reference to FIG. 2D.

In some embodiments, the light source positioned to illuminate the user area is activated (706) in accordance with a determination that a user is approaching. In some embodiments, the charging station includes (708) one or more optical sensors, and determining that the user is approaching comprises using the one or more optical sensors. For example, with reference to FIGS. 2B-2C, the area 203 illuminated by light source 201 changes from open to shaded to illustrate the light source 201 turning on.

The charging station determines (710) a state of the charging station, the state indicating a status of an electric vehicle at the charging station.

In some embodiments, the status is (712) a state selected from the group consisting of a state indicating that the charging station is not currently occupied by an electric vehicle and is capable of providing service, a state indicating that the charging station is currently occupied by an electric vehicle, a state indicating that the charging station is out of service, a state indicating that a charge gun has been removed from a holder of the charging station but not connected to an electric vehicle, a state indicating that the charge gun has been removed from the holder and is connected to an electric vehicle without delivering a charge, a state indicating that the charge gun is connected to an electric vehicle and is delivering a charge, a state indicating that the charge gun is connected to an electric vehicle and has completed charging, a state indicating that the charge gun has been removed from an electric vehicle but has not been placed into the holder, and a state indicating that the charge gun has been returned to the holder. For example, the states are described with reference to FIGS. 5A-5B.

In some embodiments, the status comprises (714) providing (e.g., using the lighted animations, described below) two of the states concurrently. For example, the "gun placed in car" and the "in use" states occur at the same time. In some embodiments, a same sequence of animations is displayed for two states that are provided concurrently. In some embodiments, two distinct sequences of animations are displayed, for example, one after the other, to indicate the two concurrent states. In some embodiments, two distinct sequences of animations of displayed concurrently, using different light sources of the plurality of light sources. In some embodiments, a first light source provided an animation visible to the user of the charging station (e.g., to indicate that the gun has been placed in the car") and a second light source provides a second animation and/or static light display, visible from at least 10 meters away, to indicate to a second state to other drives (e.g., indicate that the charging station is in use. In some embodiments, a second light source (e.g., at the top of the charging station) is turned off when the charging station is in use.

In some embodiments, the charging station includes (716) one or more optical sensors, and the charging station determines the state of the charging station using the one or more optical sensors. For example, the one or more sensors 601 include one or more optical sensors. In some embodiments, the optical sensors are used to determine that a user is near (e.g., approaching) the EVCS. In some embodiments, the optical sensors are used to determine an electric vehicle is near (e.g., within a predefined proximity) the charging station. For example, the optical sensors can determine when a vehicle parks next to the EVCS.

The charging station, in accordance with a determination that the state is a first state, provides (718) a first visual indication of the first state using a first light source of the plurality of light sources, the first visual indication including a programmed first sequence of lights displayed using the first light source. In some embodiments, the first sequence of lights is an animated sequences of lights (e.g., the first sequences of light comprises the first light source turning on and/or off at predetermined times). For example, as described with reference to FIGS. 1A-1I, the first sequence of lights in the first (e.g., vertical) light source is displayed in accordance with a determination that the EVCS is in a first state.

In some embodiments, the first state is (720) a state that (e.g., indicating that) the charging station is not currently occupied by an electric vehicle.

In some embodiments, the first visual indication is (722) an animated sequence of illumination of a subset of the plurality of light sources, the subset including the first light source. For example, the light sources change from off to on (e.g., dark to illuminated).

In some embodiments, the first visual indication comprises (724) an animated sequence of changing colors of a subset of the plurality of light sources, the subset including the first light source. For example, as described above with reference to FIGS. 1A-1I, a portion of the vertical light source changes color (e.g., to a light blue).

The charging station, in accordance with a determination that the state is a second state, provides (726) a second visual indication of the second state, the second visual indication including a programmed second sequence of lights, distinct from the first sequence of lights, displayed using the first light source. In some embodiments, the first sequence of lights is an animated sequences of lights (e.g., the first sequences of light comprises respective light sources of the plurality of light sources turning on and/or off at predetermined times). For example, FIGS. 2A-2E illustrate a second state, and a second sequence of light animations, as compared to the first sequence described with reference to FIGS. 1A-1I. In some embodiments, at least one of the first visual indication and the second visual indication comprises (728) a lighted animation that includes simulated movement of lights. In some embodiments, the charging station provides distinct lighted animations for at least three of the states described herein.

In some embodiments, the first state is any of the states described in 712, and the second state is any other state described in 712 (distinct from the first state) (e.g., the present disclosure envisions different lighted animations corresponding to any combination of states described in 712). For example, in some embodiments, the first state indicates that the charging station is not currently occupied by an electric vehicle and is capable of providing service and the second state indicates that the charging station is currently occupied by an electric vehicle. In some embodiments, the first state indicates that a charge gun has been removed from a holder of the charging station but not connected to an electric vehicle, and the second state indicates that the charge gun has been removed from the holder and is connected to an electric vehicle without delivering a charge. In some embodiments, the first state indicates that a charge gun has been removed from a holder of the charging station but not connected to an electric vehicle, and the second state indicates the charge gun is connected to an electric vehicle and is delivering a charge. In some embodiments, the first state indicates that the charge gun is connected to an electric vehicle and is delivering a charge and the second state indicates that the charge gun is connected to an electric vehicle and has completed charging. In some embodiments, the first state indicates that the charge gun has been removed from an electric vehicle but has not been placed into the holder and the second state indicates that the charge gun has been returned to the holder.

In some embodiments, in accordance with a determination that the state is a third state, the charging station provides a third visual indication of the third state using the plurality of light sources, the third visual indication including a programmed third sequence of lights displayed using the third light source. The first, second, and third sequences of lights are all distinct (e.g., distinct animations). For example, the first state indicates that the charge gun is connected to an electric vehicle and is delivering a charge, the second state indicates that the charge gun is connected to an electric vehicle and has completed charging, and the third state indicates that the charge gun has been returned to the holder. Note, however, that any triplet of the states described in 712 is contemplated by the present disclosure.

In some embodiments, the first light source is a vertical light strip (e.g., primarily visible to a user of the charging station) and the third sequence of lights uses a horizontal light strip (e.g., at the top of the charging station, primarily visible to non-users of the charging station).

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described embodiments. The first widget and the second widget are both widget, but they are not the same condition unless explicitly stated as such.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A charging station for an electric vehicle, comprising:
    a plurality of light sources;
    one or more processors; and
    memory storing instructions for performing a set of operations, including:
        determining a status of the charging station, the status of the charging station including one or more states;
        in accordance with a determination that the status includes a first state, wherein the first state indicates that a charge gun is connected to an electric vehicle and is delivering a charge, providing a first visual indication of the first state using a first light source of the plurality of light sources, the first visual indication including a programmed first sequence of lights displayed using the first light source;
        while providing the first visual indication of the first state using the first light source, determining that the status of the charging station includes a second state, wherein the second state indicates that the charge gun is connected to an electric vehicle and has completed charging; and
        in accordance with a determination that the status of the charging station includes the second state, providing a second visual indication of the second state, the second visual indication including a programmed second sequence of lights, distinct from the first sequence of lights, displayed using a second light source of the plurality of light sources.

2. The charging station of claim 1, wherein:
the charging station includes one or more optical sensors, and
the instructions further comprise instructions for determining the status of the charging station using the one or more optical sensors.

3. The charging station of claim 1, wherein the first visual indication is an animated sequence of illumination of a subset of the plurality of light sources, the subset including the first light source.

4. The charging station of claim 1, wherein the first visual indication comprises an animated sequence of changing colors of a subset of the plurality of light sources, the subset including the first light source.

5. The charging station of claim 1, wherein the plurality of light sources includes one or more of a vertical strip light source, a horizontal strip light source, a light source surrounding a holder of a charge gun, and a light source positioned to illuminate a user area near the charging station.

6. The charging station of claim 5, wherein the light source positioned to illuminate the user area is activated in accordance with a determination that a user is approaching.

7. The charging station of claim 6, wherein:
the charging station includes one or more optical sensors, and
determining that the user is approaching comprises using the one or more optical sensors.

8. The charging station of claim 1, wherein at least one of the first visual indication and the second visual indication comprises a lighted animation that includes simulated movement of lights.

9. The charging station of claim 1, wherein the plurality of light sources is a connected strip of LEDs.

10. The charging station of claim 1, wherein the first light source comprises a vertical strip light source next to a display of the charging station, and the second light source comprises a light source surrounding a holder of a charge gun.

11. The charging station of claim 1, wherein the first light source comprises a vertical strip light source next to a display of the charging station, and the second light source comprises a horizontal strip light source above the display of the charging station.

12. The charging station of claim 1, wherein the first light source comprises a vertical strip light source next to a display of the charging station, and the second light source comprises a light source positioned to illuminate a user area near the charging station.

13. A method indicating a state of an electric vehicle charging station, comprising:
at a charging station for an electric vehicle, the charging station including a plurality of light sources, one or more processors and memory:
determining a status of the charging station, the status of the charging station including one or more states;
in accordance with a determination that the status includes a first state, wherein the first state indicates that a charge gun is connected to an electric vehicle and is delivering a charge, providing a first visual indication of the first state using a first light source of the plurality of light sources, the first visual indication including a programmed first sequence of lights displayed using the first light source;
while providing the first visual indication of the first state using the first light source, determining that the status of the charging station includes a second state, wherein the second state indicates that the charge gun is connected to an electric vehicle and has completed charging; and
in accordance with a determination that the status of the charging station includes the second state, providing a second visual indication of the second state, the second visual indication including a programmed second sequence of lights, distinct from the first sequence of lights, displayed using a second light source of the plurality of light sources.

14. A charging station for an electric vehicle, comprising:
a plurality of light sources;
one or more processors; and
memory storing instructions for performing a set of operations, including:
determining a status of the charging station, the status of the charging station including one or more states;
in accordance with a determination that the status includes a first state, wherein the first state is a state selected from the group consisting of: a state indicating that the charging station is not currently occupied by an electric vehicle and is capable of providing service, a state indicating that the charging station is currently occupied by an electric vehicle, and a state indicating that the charging station is out of service, providing a first visual indication of the first state using a first light source of the plurality of light sources, the first visual indication including a programmed first sequence of lights displayed using the first light source;
while providing the first visual indication of the first state using the first light source, determining that the status of the charging station includes a second state concurrently with the first state, wherein the second state comprises a state indicating that a user is approaching the charging station; and
in accordance with a determination that the status of the charging station includes the second state, providing a second visual indication of the second state, the second visual indication including a programmed second sequence of lights, distinct from the first sequence of lights, displayed using a second light source of the plurality of light sources.

15. A method comprising:
at a charging station for an electric vehicle, the charging station including a plurality of light sources, one or more processors and memory:
determining a status of the charging station, the status of the charging station including one or more states;
in accordance with a determination that the status includes a first state, wherein the first state is a state selected from the group consisting of: a state indicating that the charging station is not currently occupied by an electric vehicle and is capable of providing service, a state indicating that the charging station is currently occupied by an electric vehicle, and a state indicating that the charging station is out of service, providing a first visual indication of the first state using a first light source of the plurality of light sources, the first visual indication including a programmed first sequence of lights displayed using the first light source;
while providing the first visual indication of the first state using the first light source, determining that the status of the charging station includes a second state concurrently with the first state, wherein the second state comprises a state indicating that a user is approaching the charging station; and in accordance with a determination that the status of the charging station includes the second state, providing a second visual indication of the second state, the second visual indication including a programmed second sequence of lights, distinct from the first sequence of lights, displayed using a second light source of the plurality of light sources.

16. The charging station of claim 14, wherein:

the charging station includes one or more optical sensors, and the instructions further comprise instructions for determining the status of the charging station using the one or more optical sensors.

17. The charging station of claim 14, wherein the first visual indication is an animated sequence of illumination of a subset of the plurality of light sources, the subset including the first light source.

18. The charging station of claim 14, wherein the first visual indication comprises an animated sequence of changing colors of a subset of the plurality of light sources, the subset including the first light source.

19. The charging station of claim 14, wherein the plurality of light sources includes one or more of a vertical strip light source, a horizontal strip light source, a light source surrounding a holder of a charge gun, and a light source positioned to illuminate a user area near the charging station.

20. The charging station of claim 19, wherein the light source positioned to illuminate the user area is activated in accordance with a determination that a user is approaching.

* * * * *